US009411895B2

(12) United States Patent
El Daher et al.

(10) Patent No.: US 9,411,895 B2
(45) Date of Patent: Aug. 9, 2016

(54) PERSONALIZED DEEPLINKS FOR SEARCH RESULTS

(71) Applicant: MICROSOFT TECHNOLOGY LICENSING, LLC, Redmond, WA (US)

(72) Inventors: Antoine El Daher, Kenmore, WA (US); Deepak Vijaywargi, Seattle, WA (US); Yogesh Kant Roy, Bellevue, WA (US)

(73) Assignee: MICROSOFT TECHNOLGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/954,479

(22) Filed: Nov. 30, 2015

(65) Prior Publication Data

US 2016/0085870 A1    Mar. 24, 2016

Related U.S. Application Data

(63) Continuation of application No. 13/406,192, filed on Feb. 27, 2012, now Pat. No. 9,218,422, which is a continuation-in-part of application No. 13/190,744, filed on Feb. 26, 2011.

(51) Int. Cl.
*G06F 17/30* (2006.01)
(52) U.S. Cl.
CPC .... *G06F 17/30867* (2013.01); *G06F 17/30554* (2013.01)
(58) Field of Classification Search
CPC ................................................. G06F 17/30867
See application file for complete search history.

(56) References Cited

U.S. PATENT DOCUMENTS

| 5,794,259 A | 8/1998 | Kikinis |
| 7,702,678 B2 | 4/2010 | Teague |
| 7,788,278 B2 | 8/2010 | Cheng et al. |
| 7,836,009 B2 | 11/2010 | Paczkowski et al. |
| 7,930,384 B1 | 4/2011 | Lester et al. |
| 2007/0038641 A1 | 2/2007 | Fawcett et al. |
| 2007/0198741 A1 | 8/2007 | Duffy et al. |
| 2007/0255735 A1 | 11/2007 | Taylor et al. |
| 2007/0283425 A1 | 12/2007 | Ture et al. |
| 2008/0005072 A1 | 1/2008 | Meek et al. |

(Continued)

OTHER PUBLICATIONS

Seo et al. "Generalized Link Suggestions via Web Site Clustering" Mar. 28-Apr. 1, 2011, In proceedings of the 20th International conference on World Wide Web.*

(Continued)

*Primary Examiner* — Kris Mackes
(74) *Attorney, Agent, or Firm* — Dave Ream; Tom Wong; Micky Minhas

(57) ABSTRACT

Search results are provided with personalized deeplinks for an end user. User behavior information is gathered regarding web pages visited by the end user. When the end user submits a search query, the website category of a search result is identified and user behavior information regarding web pages visited at other websites within the website category is identified. At least one deeplink is selected for the search result based on that user behavior information. In some instances, user behavior information may be tracked for a group of end users. The user behavior information for the group of end users may be used in conjunction with the user behavior information for the end user to facilitate deeplink selections for search results returned in response to search queries from the end user.

20 Claims, 13 Drawing Sheets

(56) References Cited

U.S. PATENT DOCUMENTS

| | | | |
|---|---|---|---|
| 2008/0133540 | A1 | 6/2008 | Hubbard et al. |
| 2008/0200154 | A1 | 8/2008 | Maharajh et al. |
| 2008/0313574 | A1 | 12/2008 | Aravamudan et al. |
| 2009/0089245 | A1 | 4/2009 | Chi |
| 2009/0193007 | A1 | 7/2009 | Mastalli et al. |
| 2009/0204579 | A1 | 8/2009 | Govani et al. |
| 2009/0204610 | A1 | 8/2009 | Hellstrom et al. |
| 2009/0325556 | A1 | 12/2009 | Lee et al. |
| 2009/0327860 | A1 | 12/2009 | Georgiev et al. |
| 2010/0049709 | A1 | 2/2010 | Ravikumar et al. |
| 2010/0114908 | A1 | 5/2010 | Chand et al. |
| 2010/0223244 | A1 | 9/2010 | Sinha et al. |
| 2010/0228731 | A1 | 9/2010 | Gollapudi |
| 2010/0250528 | A1* | 9/2010 | Punera .............. G06F 17/30991 707/726 |
| 2011/0072046 | A1 | 3/2011 | Chi |
| 2011/0087647 | A1 | 4/2011 | Signorini et al. |
| 2011/0119269 | A1 | 5/2011 | Agrawal et al. |
| 2011/0125759 | A1 | 5/2011 | Quérel et al. |
| 2011/0131241 | A1 | 6/2011 | Petrou et al. |
| 2011/0137989 | A1 | 6/2011 | Kiciman et al. |
| 2011/0191316 | A1 | 8/2011 | Lai et al. |
| 2011/0225192 | A1 | 9/2011 | Imig et al. |
| 2011/0252060 | A1 | 10/2011 | Broman et al. |
| 2011/0258032 | A1 | 10/2011 | Vadlamani et al. |
| 2011/0264673 | A1 | 10/2011 | White et al. |
| 2011/0295861 | A1 | 12/2011 | Lacasse |
| 2012/0023089 | A1* | 1/2012 | Chandra ........... G06F 17/30899 707/709 |
| 2012/0245925 | A1 | 9/2012 | Guha et al. |

OTHER PUBLICATIONS

Bayer, Derek, "Bing: Decision Engine Instead of Search Engine?", Retrieved on: Apr. 20, 2011, Available at: http://www.derekbayer.com/bing-decision-engine-instead-of-search-engine.

O'Technology Weblog, "Bing Bar Lands with 'Search, Alerts, Facebook, Mail and Bing Reward'", Retrieved on: Apr. 20, 2011, Available at: http://www.ditii.com/2011/02/17/bing-bar-lands-with-search-alerts-facebook-mail-and-bing-reward/.

Guess, Angela, "Bing Further Leverages the Semantic Web with Action Buttons", Published on: Sep. 26, 2011, Available at: http://semanticweb.com/bing-further-leverages-the-semantic-web-with-action-buttons_b23447.

Henzinger, Monika, "Link Analysis in Web Information Retrieval", In Proceedings of Bulletin of the IEEE Computer Society Technical Committee on Data Engineering, vol. 23, Issue 3, Sep. 2000, pp. 3-8.

Kammenhuber, et al., "Web Search Clickstreams", In Proceedings of Internet Measurement Conference, Oct. 25-27, 2006, 6 pages.

Lakkaraju, et al., "Unified Modeling of User Activities on Social Networking Sites", In Proceedings of NIPS Workshop on Computational Social Science and the Wisdom of Crowds, 2011, pp. 1-5.

Mika, Peter, "Ontologies Are Us: A Unified Model of Social Networks and Semantics", In Proceedings of ISWC vol. 3729, Nov. 2005, pp. 522-536.

Shazly, et al., "Profile-Based Mood Extraction from a Social Network", In Proceedings of International Conference on Internet Computing, Jul. 17, 2011, 7 pages.

Sizemore, Everett, "Building Deep Links into E-Commerce Product Pages", Retrieved on: Apr. 20, 2011, Available at: http://www.seomoz.org/blog/building-deep-links-into-ecommerce-pages.

Taksa, et al., "A Task-oriented Approach to Search Engine Usability Studies", In Journal of Software, vol. 3, No. 1, Jan. 2008, pp. 63-73.

White, et al., "Predicting Short-Term Interests Using Activity-Based Search Context", In Proceedings of the 19th ACM International Conference on Information and Knowledge Management, vol. 36, Issue 4, Aug. 2006, pp. 873-886.

Kang, "Transactional Query Identification in Web Search", AIRS 2005, Springer-Veriag, Berlin Heidelberg, 2005, pp. 221-232.

* cited by examiner

PERSONALIZED DEEPLINKS FOR SEARCH RESULTS

CROSS-REFERENCE TO RELATED APPLICATIONS

This application is a continuation of U.S. patent application Ser. No. 13/406,192, filed Feb. 27, 2012, which is a continuation-in-part of U.S. patent application Ser. No. 13/190,744, filed Jul. 26, 2011. Each of the aforementioned applications is herein incorporated by reference in its entirety. This application is also related by subject matter to the inventions disclosed in the following U.S. patent applications: U.S. patent application Ser. No. 13/406,181, filed Feb. 27, 2012, entitled "Context-Aware Parameterized Action Links for Search Results;" and U.S. patent application Ser. No. 13/406,203, filed Feb. 27, 2012, entitled "Surfacing Actions from Social Data;" which are assigned or under obligation of assignment to the same entity as this application, and incorporated in this application by reference.

BACKGROUND

The amount of information and content available on the Internet continues to grow exponentially. Given the vast amount of information, search engines have been developed to facilitate web searching. In particular, users may search for information and documents by entering search queries comprising one or more terms that may be of interest to the user. After receiving a search query from a user, a search engine identifies documents and/or web pages that are relevant based on the terms. A search page is returned with a list of hyperlinks to "landing pages" that correspond with the identified documents and/or web pages. Because of its utility, web searching, that is, the process of finding relevant web pages and documents for user-issued search queries has arguably become one of the most popular services on the Internet today. However, in some instances, when a user selects a search result and accesses a landing page, although that landing page may be within a website (i.e., collection of web pages within a given domain) that contains the information the user is after, that particular landing page may not have the relevant information. As a result, the user may have to browse or search pages within the website to find the information the user is seeking.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing personalized deeplinks for search results selected based at least in part on an end user's behavior information. The user behavior information may include, for instance, information regarding the web pages visited by the end user during general web browsing and/or via deeplink selections from search results. The user behavior information may be tracked and then employed when the end user submits a search query to select deeplinks for a search result. In particular, the website category of a search result may be identified, and information regarding web pages visited by the end user at other websites within that website category is then used to select at least one deeplink for the search result. In some instances, user behavior information for a group of other end users may also be employed in conjunction with the user behavior information for the end user to facilitate selection of search result deeplinks in response to search queries from the end user.

BRIEF DESCRIPTION OF THE DRAWINGS

The present invention is described in detail below with reference to the attached drawing figures, wherein.

DETAILED DESCRIPTION

Figure 1:
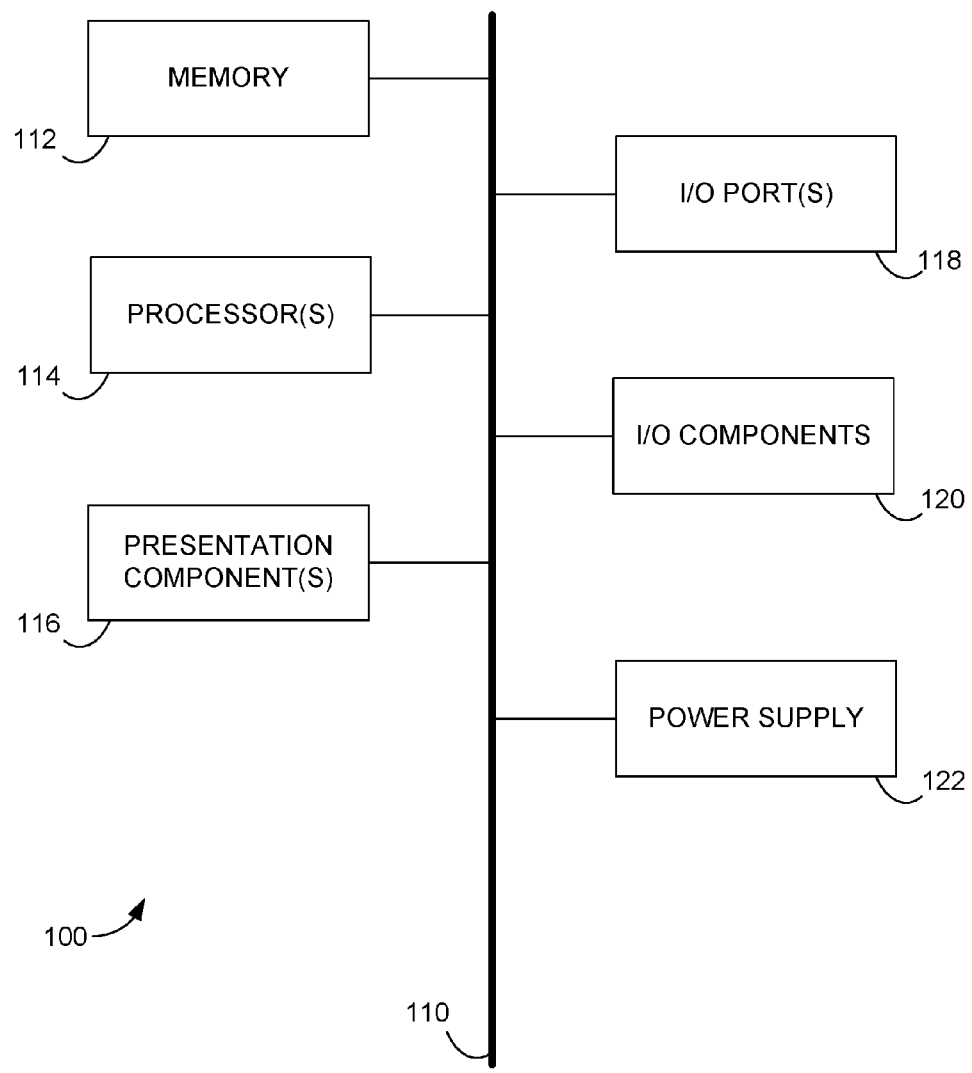
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed above, one problem that users may face when employing search engines is that although a search result returned may correspond with a web page within a website containing the relevant information the user is seeking or a particular action the user wishes to perform, the user may be required to browse the website after selecting the search result to find the information or to perform the action. For instance, suppose a user wishes to check into a flight on an airline. The user may issue a search query for the airline and receive search results that include a hyperlink to the main web page of the website for the airline. After selecting the hyperlink to the main web page for the airline, the user would then need to find a location within the web site for checking into the flight. In some cases, this may be a time-consuming task.

One approach to addressing this problem has been the inclusion of deeplinks in search results on search result pages. As used herein, the term "deeplinks" refers to additional hyperlinks that are provided in association with a matching search result. In other words, a search result may include a hyperlink to a main destination web page, as well as deeplinks to other web pages to which the main destination web page links. For instance, in the example above, the main web page for the airline (i.e., the main destination web page) may include a hyperlink to a web page within the airline's website for logging into flights for the airline. Accordingly, a hyperlink to the location for checking into flights for the airline could be included as a deeplink in association with the hyperlink to the main web page for the airline provided as a search result to a user's search query. Although deeplinks allow users to more quickly access the information they are seeking or perform particular actions, the deeplinks included in search results vary from web page to web page, resulting in a fragmented experience for users. As a result, users may not quickly recognize a deeplink and may even simply select the hyperlink to the main destination web page for the search result, thereby missing out on the benefits of the deeplinks. Additionally, a variety of deeplinks may be available for a search result, but given the limited space for the search result, only a subset of the available deeplinks may be presented. In some instances, a deeplink that links to an action or information the user is seeking is not one of the displayed deeplinks.

Some embodiments of the present invention are directed to providing action-based deeplinks with search results to provide a more consistent experience across web pages within a category of web pages. The action-based deeplinks link to locations that allow users to perform actions that are common to a given web page category. For instance, suppose that a web page category is an airline category, which includes the web pages of different airlines. The action-based deeplinks that may be provided would link to locations within the airline websites that allow users to perform airline-related actions such as checking into flights, check the status of flights, and booking flight reservations. To provide a consistent experience, the search results for airline web pages returned in response to search queries may have the same type of action-based deeplinks. While the action-based deeplinks are similar to traditional deeplinks, the action-based deeplinks differ from traditional deeplinks in that while traditional deeplinks are specific to a given web page, the action-based deeplinks are similar for web pages within a given category, thereby providing a more consistent user experience. This approach makes it easier for users to quickly navigate to a desired location and perform key tasks, thereby reducing the overall time required to perform the tasks.

In some embodiments of the present invention, action-based deeplinks may be identified for web pages by first categorizing web pages into a variety of categories. Each category is then analyzed to identify action-based deeplinks for web pages in each category. For a given category, hyperlinks within web pages of that category are identified and grouped into a number of clusters. Each cluster may correspond with a particular action users perform when visiting the web pages. For instance, in the example of airlines categories, the actions may include checking into a flight, check the status of a flight, and making flight reservations. Hyperlinks are identified within web pages that allow users to perform each action. Based on that information, action-based deeplinks may be provided when returning search results for those web pages. Again, because the action-based deeplinks may be similar among web pages within a given category, a more consistent user experience may be provided that allows users to more quickly perform desired tasks.

Further embodiments of the present invention are directed to providing search results with personalized deeplinks for an end users. User behavior information is tracked for the end user. The user behavior information may include information regarding web pages visited by the end user at various websites. The web pages may have been visited by the end user, for instance, during general web browsing or by selecting a deeplink from a search result. When the end user submits a search query, the user behavior information may be employed to select deeplinks for a search result. In particular, the website category of a search result may be identified. Additionally, the user behavior information may be analyzed to identify web pages visited by the end user at other websites within that website category. Information regarding those web pages visited by the end user at other websites within that website category may then be used to select deeplinks for the search result.

In some instances, user behavior information may be gathered for a group of end users and used in conjunction with user behavior information for the end user to select search result deeplinks. For instance, when the end user submits a search query, a website category of a search result may be identified. A web page visited by the end user at a second website within that website category may also be identified. User behavior information for a group of end users may be used to determine web pages at the website that were visited by other end users who also visited the web page at the second website. That information may then be used to select deeplinks for the search result.

Accordingly, in one aspect, an embodiment of the present invention is directed to one or more computer storage media storing computer-useable instructions that, when used by one or more computing devices, cause the one or more computing devices to perform a method. The method includes identifying website categories for a plurality of websites. The method also includes identifying deeplink pages within the websites and a deeplink page type for each deeplink page. The method further includes gathering user behavior information for an end user regarding deeplink pages visited by the end user, the user behavior information mapping deeplink page types of deeplink pages visited by the end user to website categories of websites at which the deeplink pages visited by the end user are located. The method still further includes storing the user behavior information for use in selecting personalized deeplinks for search results for the end user.

In another embodiment, an aspect is directed to one or more computer storage media storing computer-useable instructions that, when used by one or more computing devices, cause the one or more computing devices to perform a method. The method includes receiving a search query from an end user and identifying a web page in response to the search query by querying a search engine index based on the search query. The method also includes identifying a website category of a website at which the web page is located. The method further includes accessing user behavior information for the end user. The method also includes selecting a deeplink for a search result for the web page based at least in part on the user behavior information for the end user and the website category for the website at which the web page is located, the deeplink corresponding with a deeplink page at the website. The method further includes generating the search result for the web page to include the deeplink. The method still further includes providing the search result for presentation to the end user.

A further embodiment of the present invention is directed to a method. The method includes receiving a search query from an end user and identifying a web page in response to the search query by querying a search engine index based on the search query. The method also includes identifying a website category of a website at which the web page is located. The method further includes accessing user behavior information for the end user. The method also includes identifying, from the user behavior information for the end user, a second deeplink page visited by the end user at a second website within the website category to which the web page corresponds. The method further includes accessing user behavior information for a group of end users. The method also includes selecting, using the user behavior information for the group of users, a deeplink for a search result for the web page based at least in part on deeplink pages visited at the website by a subset of users from the group of end users who also visited the second deeplink page at the second website. The method still further includes generating the search result for the web page to include the deeplink and providing the search result for presentation to the end user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not include signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Action-Based Deeplinks

Figure 2:
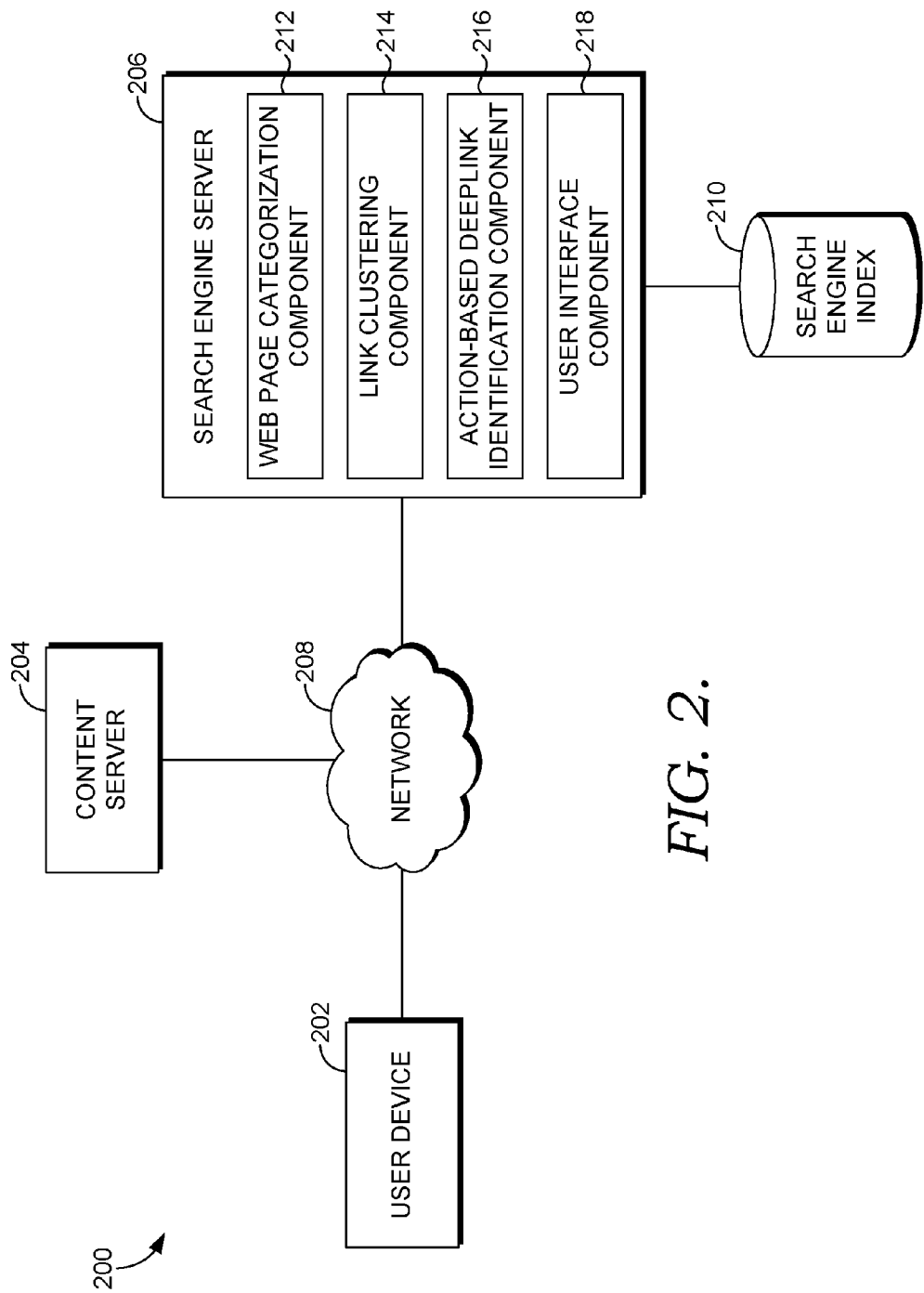
FIG. 2 is a block diagram of an exemplary system in which embodiments of the invention may be employed.

As previously indicated, action-based deeplinks may be provided with search results to allow users to access and perform actions that are common to web pages within a given category. Referring to FIG. 2, a block diagram is provided illustrating an exemplary system 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a user device 202, content server 204, and search engine server 206. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 200 within the scope of the present invention. Each may comprise a single device or multiple devices cooperating in a distributed environment. For instance, the search engine server 206 may comprise multiple devices arranged in a distributed environment that collectively provide the functionality of the search engine server 206 described herein. Additionally, other components not shown may also be included within the system 200.

The search engine server 206 generally operates to index information regarding web pages served by content servers, such as the content server 204, in a search engine index 210. When the search engine server 206 receives search queries from user devices, such as the user device 202, the search engine queries the search engine index 210 to identify search results based on the users' search queries and returns those search results to the user devices. In accordance with embodiments of the present invention, the search engine server 206 is also configured to identify action-based deeplinks for some web pages and to provide those action-based deeplinks when providing search results corresponding with those web pages.

In the embodiment shown in FIG. 2, the search engine server 206 includes, among other things, a web page categorization component 212, a link clustering component 214, an action-based deeplink identification component 216, and a user interface component 218.

The web page categorization component 212 operates to identify a category for each of a number of different web pages served by content servers, such as the content server 204, and indexed in the search engine index 210. As a result, web pages are clustered together into various categories. By way of example only and not limitation, the web page categorization component 212 may identify web pages within a restaurants category, hotels category, airlines category, and social networks category, to name a few.

Web page categorization may be performed in any of a number of different manners within the scope of embodiments of the present invention. In some embodiments, the categorization may be based on an existing repository of web page categorizations, such as the Open Directory Project (ODP). In some embodiments, web pages may be automatically grouped together into categories by analyzing the content of the pages. For instance, clustering techniques may be employed to cluster the web pages based on their content. As another example, the web pages may be categorized by looking for particular keywords in the content of the web pages. Web page categorization could also be automatically performed by analyzing the hyperlinks within the content of the web pages. Web page categorization may also include a manual approach based on editorial review of web pages to manually place the web pages into the different categories. In still further embodiments, a sample of manually-categorized web pages may be used as seeds for an automatic approach in which other web pages are compared against the seed web pages to categorize the other web pages. Any and all such variations and combinations thereof are contemplated to be within the scope of embodiments of the present invention.

The link clustering component 214 operates to cluster hyperlinks found on web pages within each category. For a given category, the link clustering component 214 may analyze hyperlinks contained within the web pages within that given category to cluster the hyperlinks into a number of clusters. The clustering may be performed in some embodiments by analyzing the words in the anchor text of the hyperlinks. As is known in the art, the anchor text refers to the displayed text of a hyperlink. Hyperlinks containing similar words would be clustered together. In some embodiments, the content of each hyperlink's destination web page may be analyzed to cluster the hyperlinks. In still further embodiments, the clustering may include manual review of hyperlinks and/or destination web pages of the hyperlinks to facilitate clustering.

In some embodiments, the link clustering component 214 may analyze and cluster all hyperlinks within each web page within the category. In other embodiments, the link clustering component 214 may cluster only a portion of hyperlinks from the web pages. For instance, the link clustering component 214 may consider only the hyperlinks that meet some threshold based on user clicks on the hyperlinks. In some embodiments, the search engine server 206 may receive click-through data collected by web browsers, search toolbars, or other mechanisms on user devices, such as the user device 202. The click-through data may indicate the hyperlinks that users have clicked within web pages when viewing those web pages. Based on such click-through data, the most-clicked hyperlinks on a given web page may be identified and only those hyperlinks considered by the link cluster component 214. For instance, only the hyperlinks that have received a threshold number of clicks or that have a threshold click-through rate (i.e., the percentage of web page visits for the web page that have resulted in a click on the hyperlink) may be considered.

In some embodiments, the search engine server 206 may be configured to provide traditional deeplinks. In such embodiments, the link clustering component 214 may consider only hyperlinks corresponding with the deeplinks for the web page. All deeplinks may be considered in some embodiments, while only a portion of the deeplinks may be considered in other embodiments. For an example of the latter, the search engine server 206 may track user clicks of deeplinks from search results. Based on such click data, the search engine server 206 may identify the hyperlinks that correspond with the most-clicked deeplinks and only those hyperlinks considered by the link cluster component 214. For instance, only the hyperlinks that correspond with deeplinks that have received a threshold number of clicks or that have a threshold click-through rate (i.e., the percentage of search results for the web page that have resulted in a click on the deeplink) may be considered.

Based on the clustering of hyperlinks from the link clustering component 214, the action-based deeplink identification component 216 may identify one or more different types of actions for the web page category being analyzed. In particular, each action may correspond with a type of action users perform using hyperlinks within a cluster of hyperlinks. For instance, if the web page categorization being analyzed is an airlines category, a first cluster of hyperlinks may correspond with locations for checking into flights, a second cluster of hyperlinks may correspond with locations for checking the status of flights, and a third cluster of hyperlinks may correspond with locations book making flight reservations. As such, a check in action may be identified based on first cluster of hyperlinks, a check status action may be identified based on the second cluster of hyperlinks, and a reservations action may be identified based on the third cluster of hyperlinks.

In some embodiments, the action-based deeplink identification component 216 may consider each cluster identified by the link clustering component 214 and identify an action for each of those clusters. In other embodiments, only clusters that meet some threshold may be processed by the action-based deeplink identification component 214 to identify an action for each of those clusters. For instance, in some embodiments, only clusters that include a threshold number of hyperlinks may be further processed by the action-based deeplink identification component 214. In some embodiments, click-through rates for each hyperlink in a cluster may be analyzed to determine whether to process the cluster. In such embodiments, actions may be identified only for clusters with hyperlinks that satisfy a threshold level of click-throughs. The click-through data may represent user clicks on hyperlinks when visiting the web page. Such click-though data may be collected by web browsers, search engine tool bars, or other mechanisms on user devices, such as the user device 202, and provided to the search engine server 206. In instances in which the hyperlinks correspond with deeplinks, deeplink click-through data may be employed. The deeplink click-through data represents user clicks on deeplinks presented in search results.

After identifying an action for a web page category, the action-based deeplink identification component 216 may identify, for web pages within the category, hyperlinks that correspond with that action. For instance, if the web page category being analyzed is an airlines category and an identified action is checking into flights, hyperlinks on web pages within the category that link to locations that allow users to check into flights would be identified as corresponding with that action. The URL for those locations or other information may then be stored in association with each web page in the search engine index 210 to allow for providing action-based deeplinks when returning search results to search queries.

A hyperlink corresponding with an action may be identified for web pages within a given category in a number of different ways. In some instances, the hyperlinks may be identified from the cluster of hyperlinks for that action. In some cases, a web page may not have had a hyperlink placed in that cluster. For such a web page, hyperlinks from that web page may be analyzed to identify a hyperlink that corresponds with the action. This may include, for instance, automatically analyzing the anchor text of hyperlinks and/or the content of the destination web pages of the hyperlinks to identify a hyperlink that corresponds with the action. For instance, the anchor text or content of the destination web page for a hyperlink may be compared against the anchor text and/or destination web page content for hyperlinks in the cluster of hyperlinks used to identify the action. In some embodiments, editors may manually review web pages to identify hyperlinks that correspond with an action. Any and all such variations and combinations thereof are contemplated to be within the scope of embodiments of the present invention.

In some embodiments, a hyperlink may be identified for a particular action for only a portion of web pages in the category. In other embodiments, a hyperlink for an action may be identified for most or even all web pages in the category. In this way, an action-based deeplink may be provided with search results for the web pages in the category to provide users with a consistent experience. This would allow users to more quickly get to the information and perform desired actions.

The user interface component 218 provides an interface to user devices, such as the user device 202, that may allow users to submit search queries to the search engine server 206 and to receive search results from the search engine server 206. It should be understood that the user device 202 may be any type of computing device employed by a user to submit search queries and receive search results. By way of example only and not limitation, the user device 202 may be a desktop computer, a laptop computer, a tablet computer, a mobile device, or other type of computing device. The user device 202 may include an application that allows a user to enter a search query and submit the search query to the search engine server 206 to retrieve search results. For instance, the user device 202 may include a web browser that includes a search input box or allows a user to access a search page to submit a search query. Other mechanisms for submitting search queries to search engines are contemplated to be within the scope of embodiments of the present invention.

When the search engine server 206 receives a search query, the search engine index 210 is queried to identify search results. In some instances, a search result may have a corresponding action-based deeplink that has been identified by the action-based deeplink identification component 216. Accordingly, when the search engine server 206 returns the search result to the user device 202, the search result includes not only a hyperlink to the destination web page of the search result, but also an action-based deeplink that links to a location that allows the user to perform a corresponding action. In some embodiments, the search engine server 206 may return a search result that includes a hyperlink to the destination web page of the search result, one or more traditional deeplinks, and one or more action-based deeplinks based on information indexed for a web page corresponding with the search result.

Figure 3:
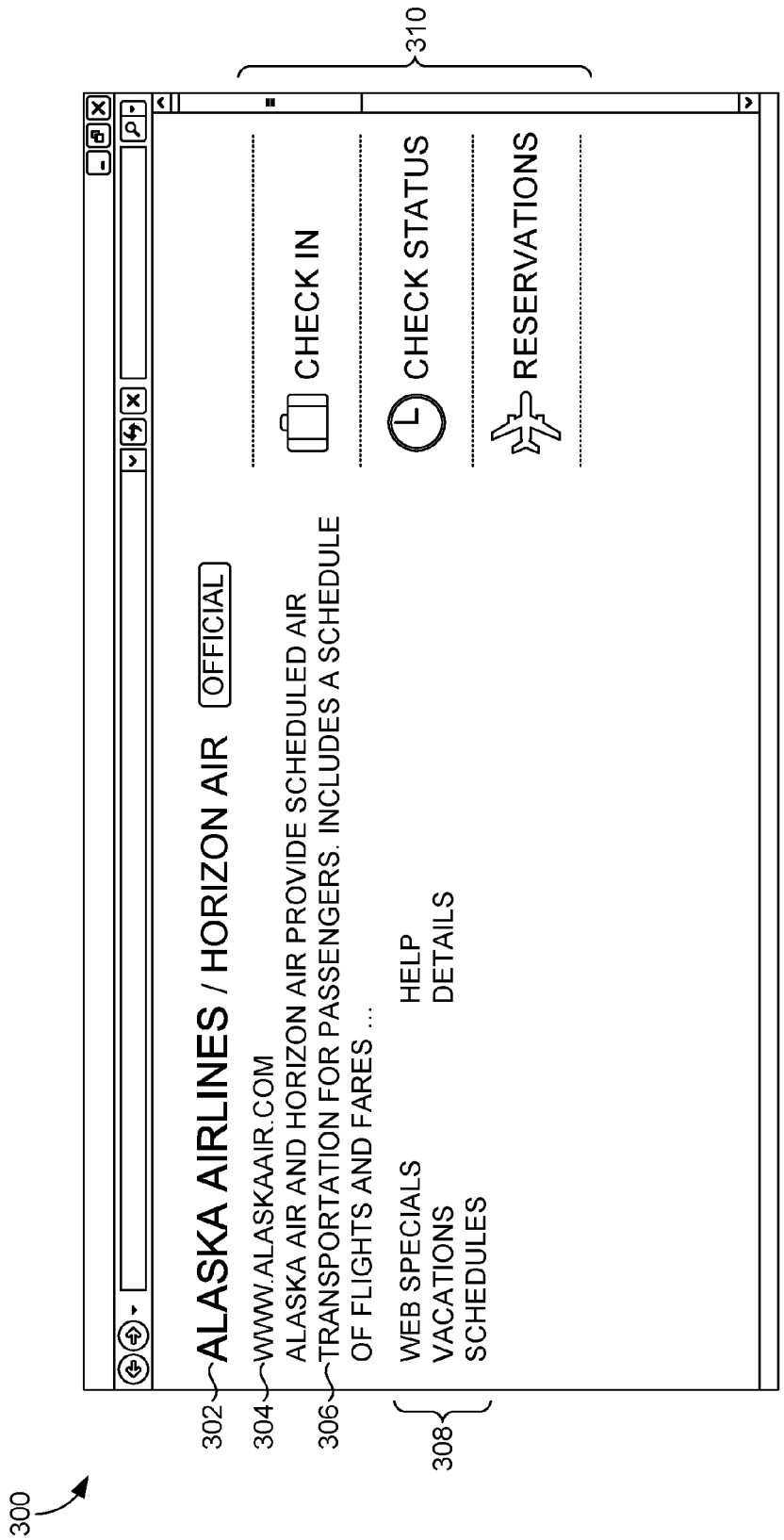
FIG. 3 is a screenshot providing an example of a search result with action-based deeplinks in accordance with an embodiment of the present invention.
Figure 4:
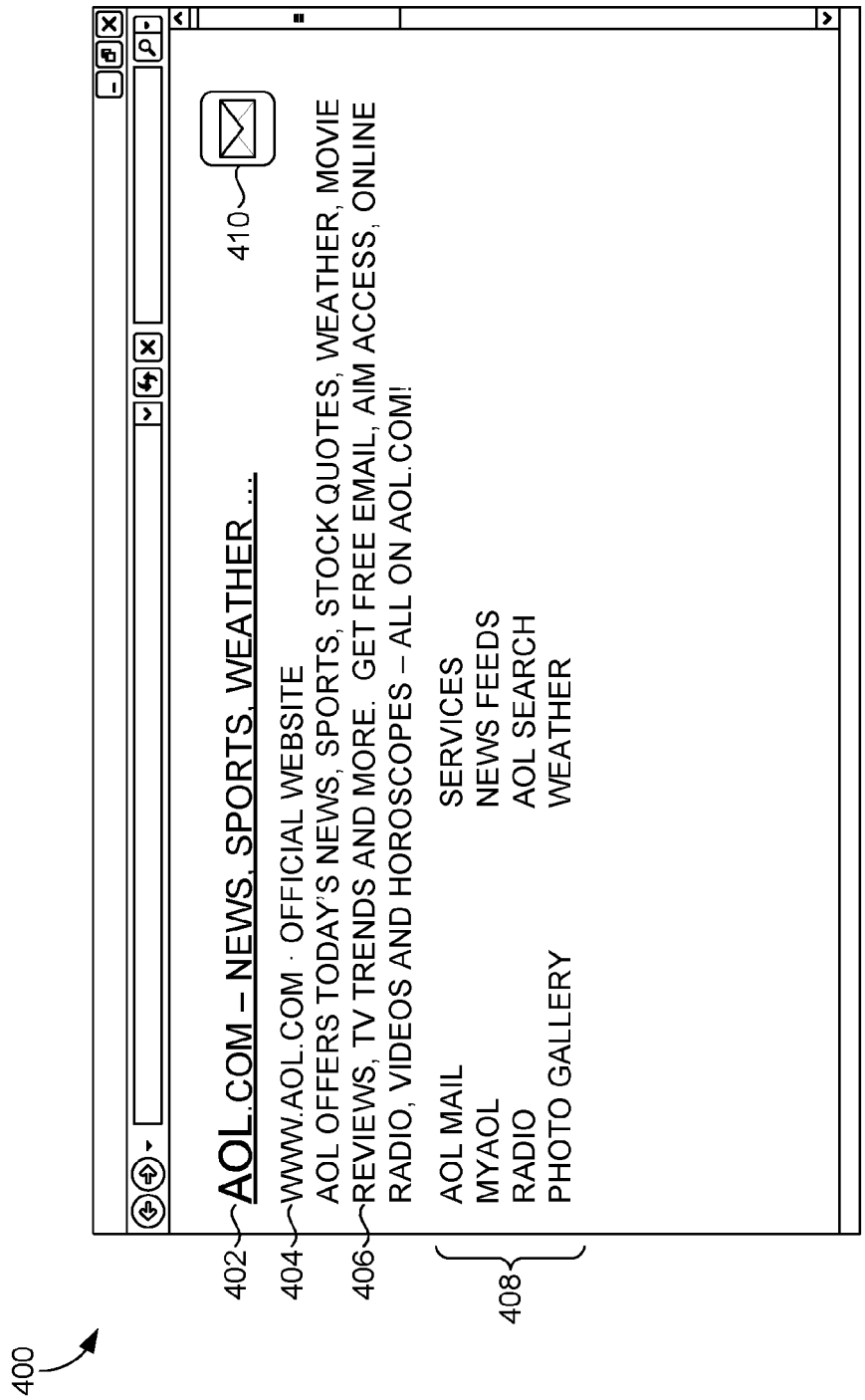
FIG. 4 is a screenshot providing another example of a search result with an action-based deeplink in accordance with an embodiment of the present invention.

Examples of search results that include action-based deeplinks are illustrated in the screen displays shown in FIGS. 3 and 4. It should be understood and appreciated by those of ordinary skill in the art that the screen displays of FIGS. 3 and 4 are provided by way of example only and are not intended to limit the scope of the present invention in any way.

Referring first to FIG. 3, a search result 300 is displayed that corresponds with the ALASKA AIRLINES web page. The search result 300 may be provided in response to a search query, such as "alaska airlines." As shown in FIG. 3, the search result 300 includes a title 302, the URL 304 of the destination web page for the search result, and a search result snippet 306 that provides a summary of the search result. The search result 300 also includes a number of deeplinks 308 and a number of action-based deeplinks 310, each of which link to a corresponding destination web page. As can be seen from FIG. 3, the search result 300 includes both deeplinks 308 and action-based based deeplinks 310. The deeplinks 308 are specific to the particular web page (i.e., corresponding with www.alaskaair.com), while the action-based deeplinks 310 were identified by analyzing web pages within the airlines category, for instance using the system described above with reference to FIG. 2. Additionally, the deeplinks 308 and action-based deeplinks 310 are displayed differently. In particular, the action-based deeplinks 310 are shown more prominently, using an icon and larger text for each.

Turning next to FIG. 4, another example of a search result 400 is provided. The search result 400 includes a title 402, the URL 404 of the destination web page for the search result 400, and a search result snippet 406. The search result also includes a number of deeplinks 408 and an action-based deeplink 410. In the example of FIG. 4, only a single action-based deeplink 410 is provided. Additionally, the action-based deeplink 410 is presented using only an icon.

In some embodiments, the action-based deeplinks displayed for search results corresponding with each web page in a given category may be consistent across the search results. That is, action-based deeplinks may be provided for the same actions. Additionally, the action-based deeplinks may be presented in a similar manner using common anchor text and/or icons. Accordingly, while the deeplinks presented may vary from web page to web page, the action-based deeplinks may be similar or the same. For instance, when search results for other airlines' web pages are provided in response to search queries, the deeplinks may be different from the deeplinks 308 shown in FIG. 3. However, the action-based deeplinks provided for each search result may be similar to the action-based deeplinks 310 shown in FIG. 3. As noted above, by providing a consistent group of action-based deeplinks for web pages within a category, users may be provided a more consistent experience. As a result, users may be able to more quickly recognize the action-based deeplinks and access a location to perform a desired action.

Figure 5:
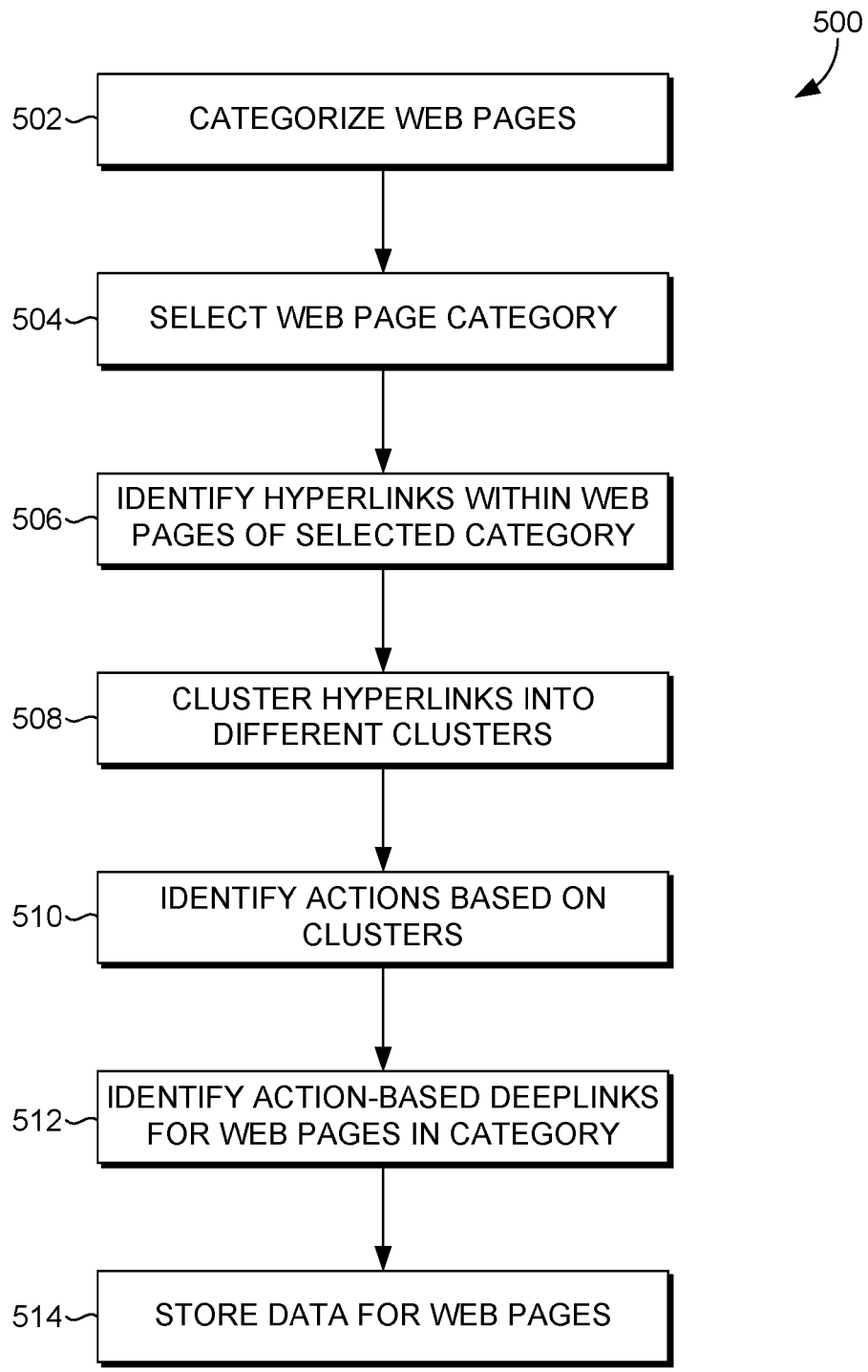
FIG. 5 is a flow diagram showing a method for identifying action-based deeplinks in accordance with an embodiment of the present invention.

With reference now to FIG. 5, a flow diagram is provided that illustrates a method 500 for identifying action-based deeplinks in accordance with an embodiment of the present invention. As shown at block 502, a number of web pages are categorized. Web page categorization may be accomplished in a variety of ways. In some embodiments, web pages may be automatically clustered into categories based on, for instance, the content of the web pages. In some embodiments, an editorial approach may be employed in which web pages may be manually categorized. In further embodiments, an existing web page categorization, such as ODP, may be employed.

As shown at block 504, a web page category is selected for analysis. Hyperlinks within the web pages within the selected category are identified, as shown at block 506. In some embodiments, all hyperlinks contained within those web pages may be identified for further processing. However, in other embodiments, only a subset of hyperlinks may be employed. For instance, some embodiments may identify hyperlinks to consider based on user click data representing user clicks on hyperlinks when users visit the web pages or user clicks on deeplinks in search results, the deeplinks corresponding with particular hyperlinks in the web pages.

The hyperlinks are clustered into a number of clusters, as shown at block 508. In various embodiments, the hyperlink clustering may be based on the anchor text of the hyperlinks, the content of the destination web pages corresponding with the hyperlinks, and/or other data. Common actions for the category of web pages are identified based on the hyperlink clusters, as shown at block 510. In particular, a cluster may be identified as corresponding with a particular action. In some instances, an action is identified for each cluster. In other embodiments, actions are only identified for clusters that meet a threshold, which may be based on, for instance, a total number of hyperlinks within a given cluster, click-through data for hyperlinks within a given cluster, or other data.

Action-based deeplinks are identified for each action for at least a portion of the web pages in the category, as shown at block 512. The action-based deeplinks correspond with hyperlinks in the web pages that link to locations corresponding with each action. Data is stored identifying the action-based deeplinks for web pages, as shown at block 514. This allows for the action-based deeplinks to be provided with search results for the web pages in response to search queries.

Figure 6:
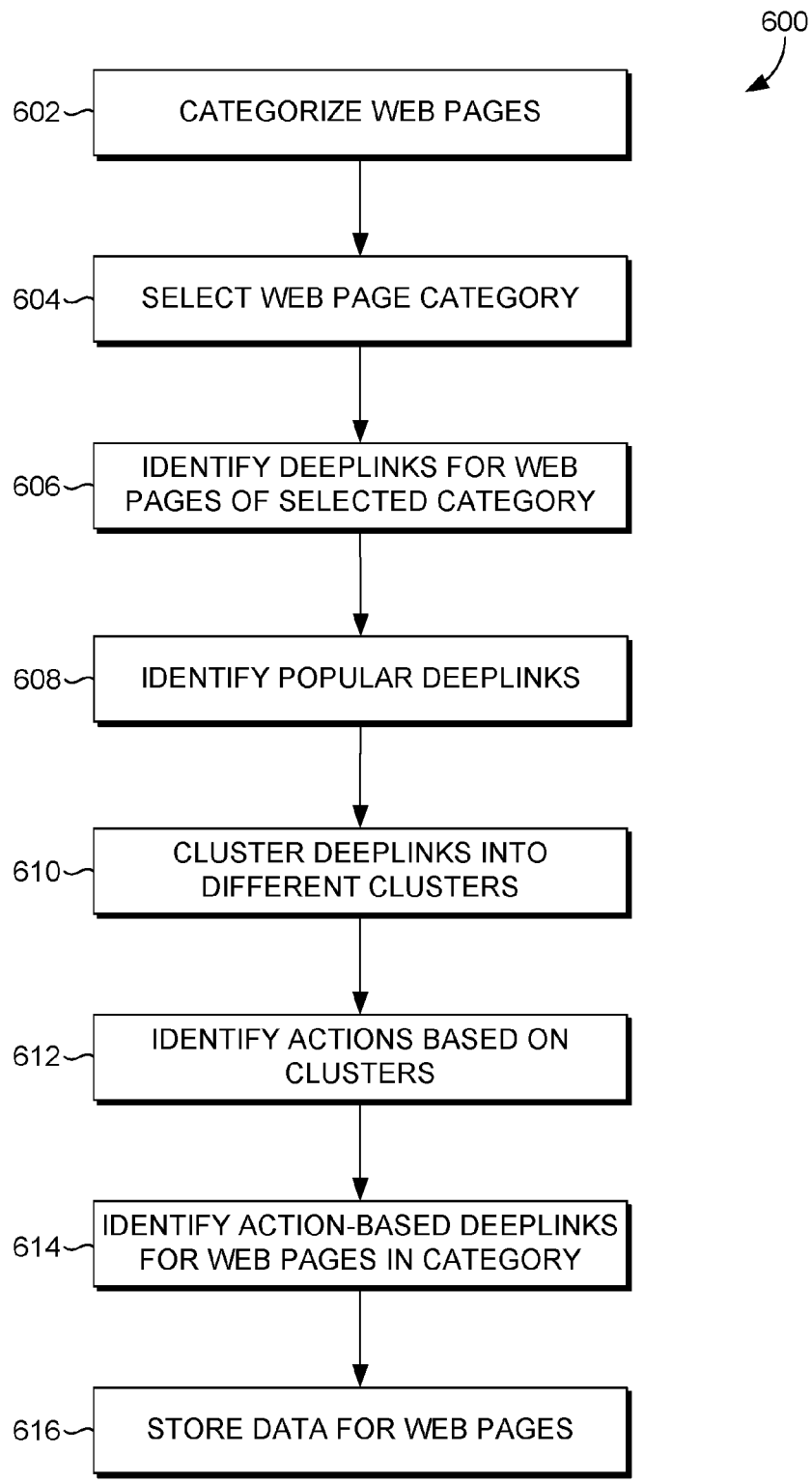
FIG. 6 is a flow diagram showing a method for identifying action-based deeplinks in accordance with another embodiment of the present invention.

As indicated previously, some embodiments may identify action-based deeplinks by analyzing deeplinks from web pages within a given web page category as opposed to analyzing all hyperlinks from those web pages. This specific approach is illustrated in the method 600 shown in FIG. 6. As shown at block 602, web pages are categorized, and a web page category is selected for analysis at block 604.

Deeplinks for web pages in the selected category are identified, as shown at block 606. These deeplinks correspond with hyperlinks that are provided in association with search results for the web pages when returning the web pages as search results in response to search queries. The deeplinks may have been previously identified for the web pages, for instance, by analyzing the hyperlinks in the web pages to identify important or popular hyperlinks (e.g., based on user clicks on the hyperlinks when users visit the web pages).

Popular deeplinks are identified at block 608. This may be performed by analyzing click-through data for the deeplinks. The click-through data may comprise information regarding user clicks on deeplinks when the deeplinks are provided with search results in response to search queries. By way of example only and not limitation, the click-through data for a deeplink may include information such as raw click data or click-through rates based on the number of clicks on the deeplink as compared to the number of times the deeplink is returned with search results.

The popular deeplinks are clustered into a number of clusters, as shown at block 610. The clustering may be based on, for instance, the anchor text of the deeplinks and/or the content of the destination web pages of the deeplinks. Actions are identified based on the clusters of deeplinks, as shown at block 612. In some instances, an action may be identified for each cluster. In other instances, only clusters that satisfy some threshold may be considered for identifying an action. The threshold may be based on, for instance, the number of deeplinks within a cluster or the popularity of the deeplinks in a cluster (e.g., based on click-through data).

For each identified action, hyperlinks within web pages within the selected category are identified as corresponding with the action, as shown at block 614. This may be done for a given action by identifying the deeplinks within the cluster corresponding with the action. In some embodiments, the hyperlinks may be automatically identified by analyzing the anchor text of hyperlinks or content of the destination web pages of the hyperlinks. This may include comparison of the anchor text or content of the destination web pages to the action or the cluster of deeplinks corresponding with the action (for instance, the anchor text or destination web pages for those deeplinks). In further embodiments, the hyperlinks may be manually identified by editors who review the web pages to identify hyperlinks corresponding with an action.

As shown at block 616, data is stored identifying the action-based deeplinks for web pages. This allows for the action-based deeplinks to be provided with search results for the web pages in response to search queries.

Figure 7:
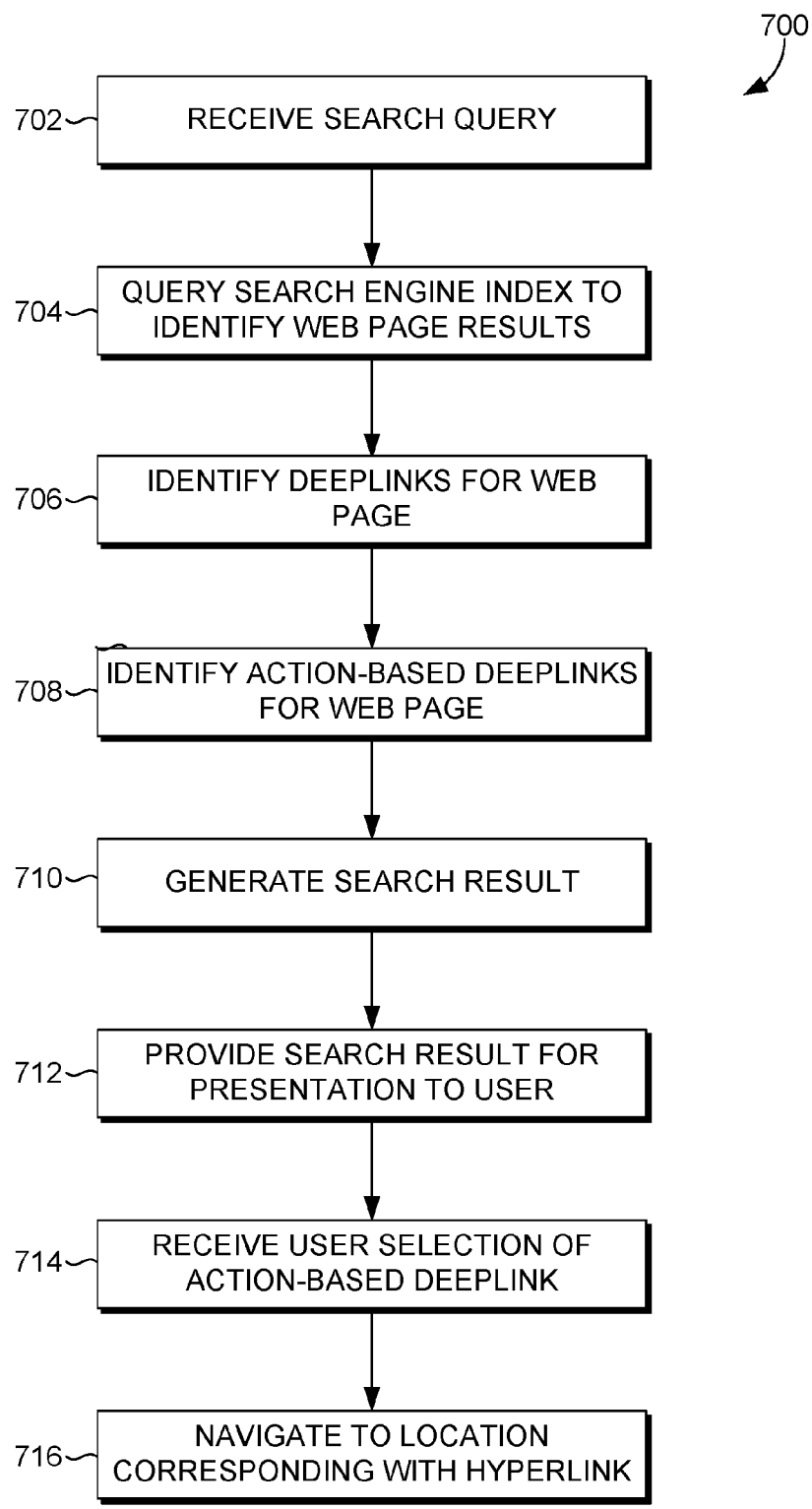
FIG. 7 is a flow diagram showing a method for returning a search result with an action-based deeplink in accordance with an embodiment of the present invention.

Turning now to FIG. 7, a flow diagram is provided that illustrates a method 700 for providing a search result that includes an action-based deeplink in response to a search query in accordance with an embodiment of the present invention. As shown at block 702, a search query is received from an end user. In response to the search query, a search engine index is searched to identify relevant web pages, as shown at block 704. Deeplinks are identified for one of the web pages, as shown at block 706. Action-based deeplinks are also identified for the web page, as shown at block 708. In particular, data may be stored for the web page, identifying deeplinks and action-based deeplinks for the web page. Accordingly, a search result is generated for the web page, as shown at block 710. The search result may include a hyperlink to the web page, the deeplinks, and the action-based deeplinks. The search result is provided to the end user device for presentation to the end user, as shown at block 712.

When the search result is presented, the search result may include a hyperlink to a destination web page corresponding with the search result. Additionally, the search result may include the deeplinks and the action-based deeplinks, which link to different web pages. In embodiments, the search result may include any number of deeplinks and action-based deeplinks. In some embodiments, the action-based deeplinks may be presented more prominently than the traditional deeplinks. The end user may select an action-based deeplink from the search result, as shown at block 714. In response to the user selection, the end user is navigated to the destination web page corresponding with the selected action-based deeplink, as shown at block 716.

Personalized Deeplinks for Search Results

Categorization information may also be employed in conjunction with previous user behavior of an end user to provide search result deeplinks that are personalized for the end user. Because the deeplinks are selected based on the end user's previous behavior, the deeplinks may be more likely to be actions and/or information that the end user is trying to access when performing searches.

To provide personalized search result deeplinks, user behavior information may initially be tracked for an end user. The user behavior information may include information regarding web pages the end user has visited during general web browsing and/or via deeplink selections made by the end user from previous search results. The visited web pages may be considered as deeplink pages since the web pages may be destination pages within websites that the end user may visit via search result deeplinks.

The user behavior information may be gathered and stored for use in selecting deeplinks for the end user during search queries. In particular, when the end user submits a search query and a web page result is identified, the website category of the website at which the web page is located may be identified. The user behavior information may then be analyzed to identify information regarding the end user's behavior at websites within the same website category. Based on that information, one or more deeplinks may be selected for the search result for the web page result. The selection may result in the deeplink(s) being included with the search result and/or the deeplink(s) being promoted in a list of deeplinks for the search result.

Figure 8A:
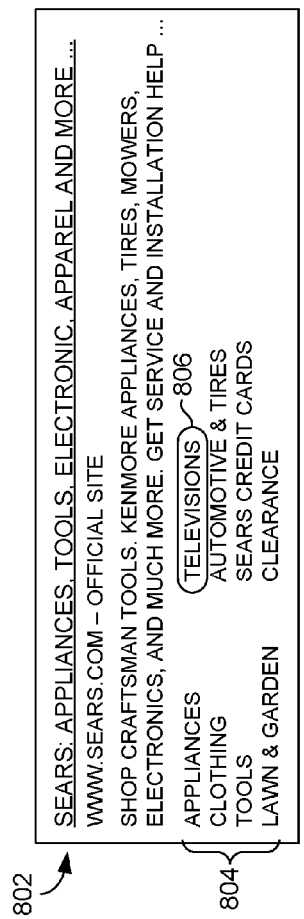
FIGS. 8A-8C are screenshots providing examples of search result deeplinks.
Figure 8B:
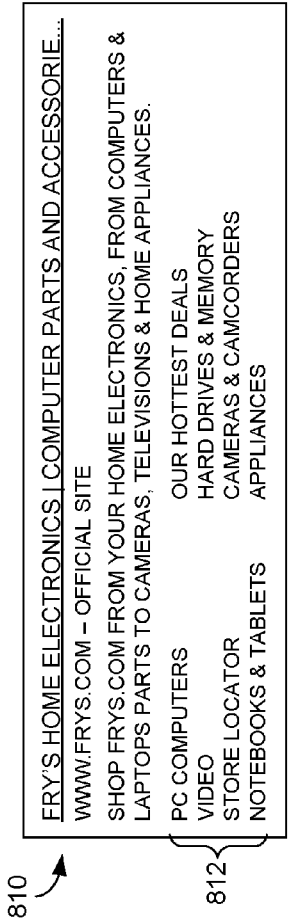

By way of example to illustrate, suppose an end user initially performs a search for "sears" that returns the search result 802 shown in FIG. 8A. As shown in FIG. 8A, the search result includes a number of deeplinks 804 that link to web pages that allow the end user to perform an action or access certain information within the "website www.sears.com." Suppose further that the end user selects the "Televisions" deeplink 806. Without the use of embodiments of the present invention, when the end user subsequently performs another search (e.g., using the search query "fry's"), a search result 810 shown in FIG. 8B may be returned that includes a list of default deeplinks 812. As represented in FIG. 8B, the list of default deeplinks 812 does not include a "Televisions" deeplink, although the website "www.frys.com" may include a deeplink page corresponding with televisions.

Figure 8C:
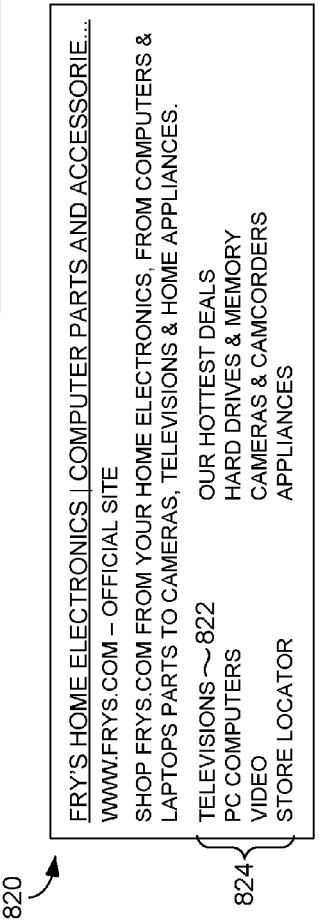

In accordance with embodiments of the present invention, however, information regarding the end user's selection of the "Televisions" deeplink 806 from the search result 802 for the website "www.sears.com" may be stored. In turn, when the end user subsequently issues a search for "frys," the search result 820 shown in FIG. 8C may be returned. As shown in FIG. 8C, a "Televisions" deeplink 822 is included in the list of deeplinks 824 for the search result 820. Additionally, the "Televisions" deeplink 822 is shown at a top-most position in the list of deeplinks 824.

In the above example, the system may recognize that the website "www.frys.com" of the search result 820 belongs in a website category of "online shopping." Based on this identification, the system may identify user behavior information for the end user at other websites in the "online shopping" website category. In this example, the system may recognize that the website "www.sears.com" is also in the "online shopping" category and look to the user's behavior associated with that website. Accordingly, based on the end user's selection of the "Televisions" deeplink 806 in the search result 802, the system may select the "Televisions" deeplink 822 as the topmost deeplink to be included with the search result 820 since those deeplinks link to deeplink pages of the same type.

It should be understood, that the user behavior information that may be employed is not limited to user selections of deeplinks in search results as in the above example. Other information, such as general web browsing information, may be employed. For instance, suppose that instead of selecting the "Televisions" deeplink 806 in the search result 802, the end user had navigated to the web page www.sears.com and then followed hyperlinks in that website until the end user reached a web page within the website that corresponds with televisions (i.e., this web page would be the web page to which the "Televisions" deeplink 806 links). The system may store information regarding the end user's web browsing to the televisions web page (i.e., deeplink page), and use that information to select the "Televisions" deeplink 822 for the search result 820.

Additionally, although the above descriptions provide simplified examples in which only a single item of user behavior information (e.g., a single previous deeplink selection) is used to select a deeplink for a search result, it should be understood that the user behavior information may include a number of previous activities by the end user (e.g., multiple deeplink selections and/or multiple web pages visited) that may be used as input for selecting a search result deeplink for the end user.

In some instances, user behavior information for a group of users may be used in conjunction with user behavior information for a particular end user to select search result deeplinks for the end user. More particularly, when an end user performs a search that identifies a particular web page result, the website category of a first website to which the web page result corresponds is identified. User behavior information for the end user may be consulted to identify a second website within that website category that the end user has visited, as well as a deeplink page within the second website that the end user has visited. User behavior information for a group of end users may then be examined to identify deeplink pages within the first website that have been visited by other end users who also visited the deeplink page at the second website visited by the end user. One or more deeplinks from the first website may be selected for the search result based on those deeplink pages within the first website visited by the other end users.

For instance, suppose again that the end user had previously selected the "Televisions" deeplink 806 from the search result 802, and the end user subsequently issues a search for "frys." The system may identify "www.frys.com" as a result and determine that the website "www.frys.com" is within an "online shopping" category. Additionally, the system may determine that the website "www.sears.com" is from the same category. Accordingly, the system may access user behavior information for a group of end users to identify information regarding which deeplink pages at the website "www.frys.com" have been visited by end users who have also visited the televisions deeplink page at the website "www.sears.com." For instance, the information may indicate that 70% of those end users visited a "television" deeplink page at the website "www.frys.com," 25% of those end users visited a "camera" deeplink page at the website "www.frys.com," and 5% of those end users visited other miscellaneous deeplink pages at the website "www.frys.com." Based on this information, the search result deeplinks selected may include a "television" deeplink and a "cameras" deeplink, both of which may be promoted in the list of deeplinks in the search result returned to the end user.

Figure 9:
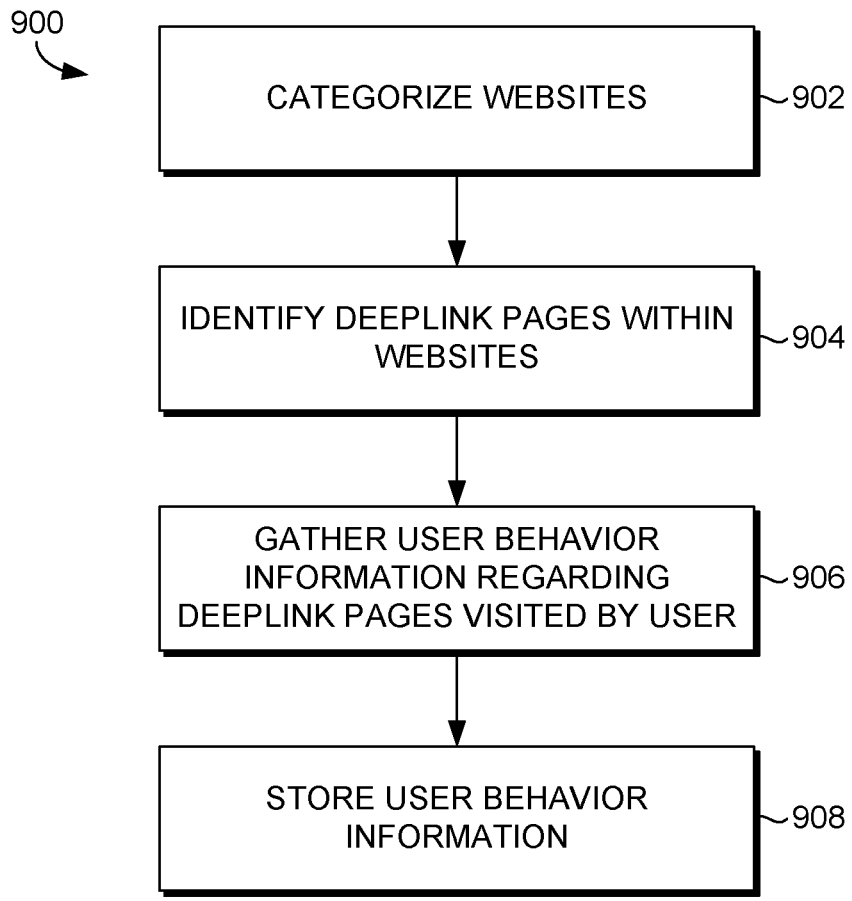
FIG. 9 is a flow diagram showing a method for generating user behavior information for an end user for use in providing personalized deeplinks in search results for the end user in accordance with an embodiment of the present invention.

Turning now to FIG. 9, a flow diagram is provided that illustrates a method 900 for generating user behavior information for an end user for use in providing personalized deeplinks in search results for the end user. As shown at block 902, websites are initially categorized. Websites may be categorized in a variety of different manners as described hereinabove. In some instances, websites may be automatically clustered into categories based on, for instance, the content of the web pages within the web site. In some embodiments, an editorial approach may be employed in which web sites may be manually categorized. In further embodiments, an existing website categorization, such as ODP, may be employed.

As shown at block 904, deeplink pages within websites are also identified, as well as a deeplink page type for the deeplink pages. As indicated previously, a deeplink page is a web page within a website that provides some specific action or specific type of information an end user may wish to access. As such, a deeplink may be provided as part of a search result with a hyperlink that links to a deeplink page to allow end users to quickly access the specific action or information. A deeplink page type represents a type of deeplink page that corresponds with a particular type of action or information that may be found in websites within a particular website category. For instance, airline websites typically include a "check-in" action that allows end users to check into flights. Accordingly, the web page at an airline site that allows end users to check into flights would be a deeplink page that corresponds with the "check-in" deeplink page type.

Deeplink pages and types may be identified in a number of different manners within the scope of embodiments of the present invention. By way of example only and not limitation, the deeplink pages and types may be identified in a manner similar to the identification of the action-based links using the method 500 discussed above with reference to FIG. 5 and/or the method 600 discussed above with reference to FIG. 6. In particular, web pages within websites of a given category may be grouped into a number of clusters, with each cluster representing a particular deeplink page type and each web page within each cluster representing a deeplink page of that type. The clustering may be based on, for instance, the anchor text of the hyperlinks that link to the web pages, the content of the web pages, and/or other data.

User behavior information regarding deeplink pages visited by a particular end user is gathered, as shown at block 906. The user behavior information may be for a current web browsing or search session or other time frame. The user behavior information may include any of a variety of different information. In some instances, the information may be gathered in view of the website categorizations and deeplink types identified at blocks 902 and 904. For instance, when the end user browses to a particular web page or selects a particular deeplink in a search result to access a corresponding web page, the system may be able to recognize the web page as a deeplink page of a particular type based on the analysis performed at blocks 902 and 904. Additionally, the system may recognize the website category of the website at which the visited web page is located. In other instances, the user behavior information may simply include an indication of web pages visited and/or deeplinks selected from search results without additional identification based on the website categorizations and/or deeplink type information.

The user behavior information may be gathered from, among other things, the end user's selections of deeplinks from search results. By way of example only and not limitation, the information gathered may include: what deeplinks were selected from search results, the type of a selected deeplink, the category of website to which a selected deeplink belongs, how long the end user dwelled at a deeplink page, how many times the end user selected a particular deeplink, how many times the end user selected deeplinks of a particular type, and how recently the end user selected a particular deeplink.

User behavior information may also be gathered from general web browsing information for the end user. By way of example and not limitation, the information gathered may include: what web pages the end user visited, the type of deeplink to which visited web pages correspond, the category of website to which a visited website belongs, how long the end user dwelled at a web page, how many times the user visited a particular web page, how many times the user visited web pages of a particular deeplink type, how recently the end user visited a particular web page.

The user behavior information may be gathered using any technique for collecting web browsing and search result interaction information. For instance, a web browser toolbar or other browser mechanism may be configured to track information on the end user's device and provide the information to a search engine service. To address privacy concerns, the features may be configured to be disabled by the end user and/or the information provided to the search engine service may correspond with an anonymous identifier that does not allow for discovery of the specific identity of the end user.

The user behavior information gathered for the end user is stored, as shown at block 908. The user behavior information may be stored, for instance, by a search engine service using an identifier of the end user that allows the information to be retrieved and used when the end user submits search queries to the search engine service. As noted above, it should be understood that an anonymous identifier may be employed to address privacy concerns of end users.

As previously noted, in some instances, website categorization and deeplink page type knowledge may be used when gathering and storing user behavior information, which may assist in processing the user behavior information during search time to facilitate selection of deeplinks for search results. For instance, when a user visits a web page (either through general web browsing or via a deeplink selection from a search result), the web page may be identified as a particular deeplink page of a particular type (e.g., based on the knowledge gathered at block 904). Additionally, the website at which the visited web page is located may be identified and a website category determined (e.g., using the knowledge gathered at block 906). The website category and the deeplink page type may then be mapped together to generate a website category-deeplink page type pair, which is stored as the user behavior information for the end user. For instance, suppose the end user visits a web page with televisions information at the website "www.sears.com." Based on this behavior, the website "www.sears.com" may be identified, and the website may be identified as belonging to an "online shopping" website category. Additionally, the visited web page may be identified as a "televisions" deeplink page type. Accordingly, the website category-deeplink page type pair generated and stored for this user behavior may be: (online shopping, televisions). It should be appreciated, however, this is only one approach provided for example purposes only, and user behavior information may be stored at other layers of abstraction. For example, the information from the above behavior could be stored using an indication of the website instead of the website category: (sears.com, televisions).

Figure 10:
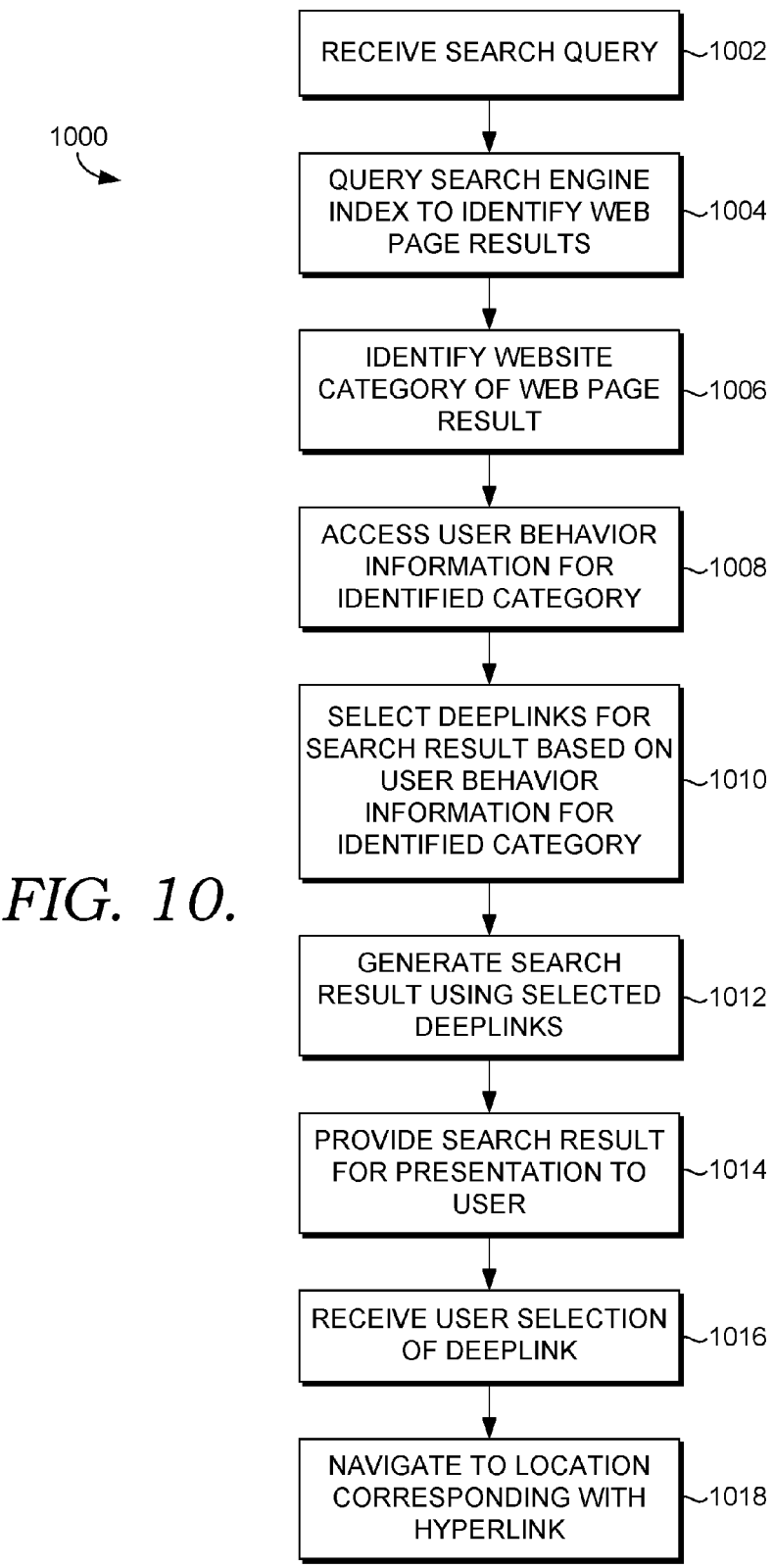
FIG. 10 is a flow diagram showing a method for providing personalized deeplinks with search results based on an end user's personal behavior information in accordance with an embodiment of the present invention.

With reference now to FIG. 10, a flow diagram is provided that illustrates a method 1000 for providing personalized deeplinks with search results based on an end user's personal behavior information. As shown at block 1002, a search query is received from an end user. In response to the search query, a search engine index is searched to identify relevant web pages, as shown at block 1004.

The website category of one of the web page results is identified, as shown at block 1006. For instance, metadata may be stored that identifies the website categories previously determined (e.g., at block 902 of FIG. 9) to allow for the categories to be recognized at search time. The category information may be stored for a website such that when a web page from that website is identified as a result for a search, the category may be determined, for example, by identifying the website from the domain name in the URL of the web page result.

User behavior information for the end user for the identified category is accessed, as shown at block 1008. In particular, the user behavior information includes information regarding deeplink pages visited by the end user. For instance, the information may have been gathered using the method 900 discussed above with reference to FIG. 9.

Deeplinks are selected for the search result based on the user behavior information, as shown at block 1010. The deeplinks selected for the search result may include at least one deeplink that is selected based on the user behavior information and other default deeplinks for the search result. As used herein, selection of a deeplink based on the user behavior information may comprise including a deeplink with the search result that otherwise would not have been included and/or promoting the deeplink to a more prominent position within a list of deeplinks for the search result. Accordingly, the selection may include ranking deeplinks for the search result and ordering the deeplinks the list of deeplinks based on the determined rankings.

Selection of a deeplink based on the user behavior information may generally include using information regarding deeplink pages that the end user has visited at other websites within the same website category as the web page result to select the deeplink for the search result. In some instances, the user behavior information may be general or relatively "unprocessed" information regarding web pages visited by the end user. In such instances, the information may be processed to identify the web pages visited by the end user at other websites in the same website category as the web page result. Those web pages may be compared with web pages at the website at which the web page result is located to identify and select deeplinks. The comparison process may be based on, for instance, the URLs of the web pages, content of the web pages, or anchor text of links to the web pages.

In other instances, the user behavior information may have been derived by pre-processing tracked user data. For instance, the user behavior information may include website category-deeplink page type pairs such as those discussed above with reference to FIG. 9.

In some instances, the user behavior information may include specific behavior information such as the number of time certain web pages were visited, when the web pages were visited, and how long the end user dwelled at the web pages. In such instances, an algorithm may be employed in which various pieces of the specific behavior information are considered in selecting a deeplink for the search result. In some instances, an algorithm may be employed in which the various pieces of specific behavior information may be weighted differently.

For instance, web pages that were visited more frequently and on which the end user dwelled longer may provide stronger signals for deeplink selection. By way of specific example, suppose that the web page result is from an "online shopping" website category. Suppose further that the end user has visited "televisions" deeplink pages at websites in that category five times and dwelled on each of those pages for an average of two minutes. Additionally, the end user has visited "camera" deeplink pages at websites in that category 2 times and dwelled on each of those pages for an average of 30 seconds. Based on these signals, the "televisions" deeplink would be given a higher ranking than the "camera" deeplink for the search result.

In some instances, a certain threshold must be satisfied before a deeplink will be selected for a search result. For instance, if the user has selected a deeplink page of a particular type only once and did not dwell on that page for any significant period of time, the signals for that type of deeplink page may be too weak to result in a deeplink of that type being selected for a search result.

A search result is generated for the web page, as shown at block 1012, based on the deeplinks selected at block 1010. The search result is then provided to the end user device for presentation to the end user, as shown at block 1014. The deeplinks included with the search result may include both default deeplinks and deeplinks selected based on user behavior information. In some instances, the deeplinks selected based on user behavior information may be displayed differently than the other deeplinks (e.g., default deeplinks) and/or using some indication to identify these deeplinks as being based on user behavior information or otherwise personalized for the end user. For instance, the deeplinks selected based on user behavior information may be highlighted or displayed with other different text treatments (bolding, underlining, etc.). As another example, the deeplinks selected based on user behavior information may be provided in a different area of the search result separate from the other deeplinks.

When the search result is presented, the search result may include a hyperlink to a destination web page corresponding with the search result as well as the deeplinks selected for the search result, which may include any number of deeplinks. The deeplinks included with the search result may include deeplinks that were selected and/or ranked higher based on user behavior information, as well as default deeplinks. In some instances, deeplinks that were selected and/or given higher priority based on the user behavior information for the end user (i.e., the personalized deeplinks) may be presented differently than other deeplinks (e.g., default deeplinks for the search result). For instance, personalized deeplinks may be shown as bold or highlighted.

The end user may select a deeplink from the search result, as shown at block 1016. In response to the user selection, the end user is navigated to the destination web page corresponding with the selected deeplink, as shown at block 1018.

A number of search results may be returned in response to search queries. In some instances, only the top search result may be processed to provide personalized deeplinks using embodiments of the present invention, such as the method 1000 of FIG. 10. In other instances, personalized deeplinks may be provided with any search result. Any and all combinations and variations thereof are contemplated to be within the scope of embodiments of the present invention.

Figure 11:
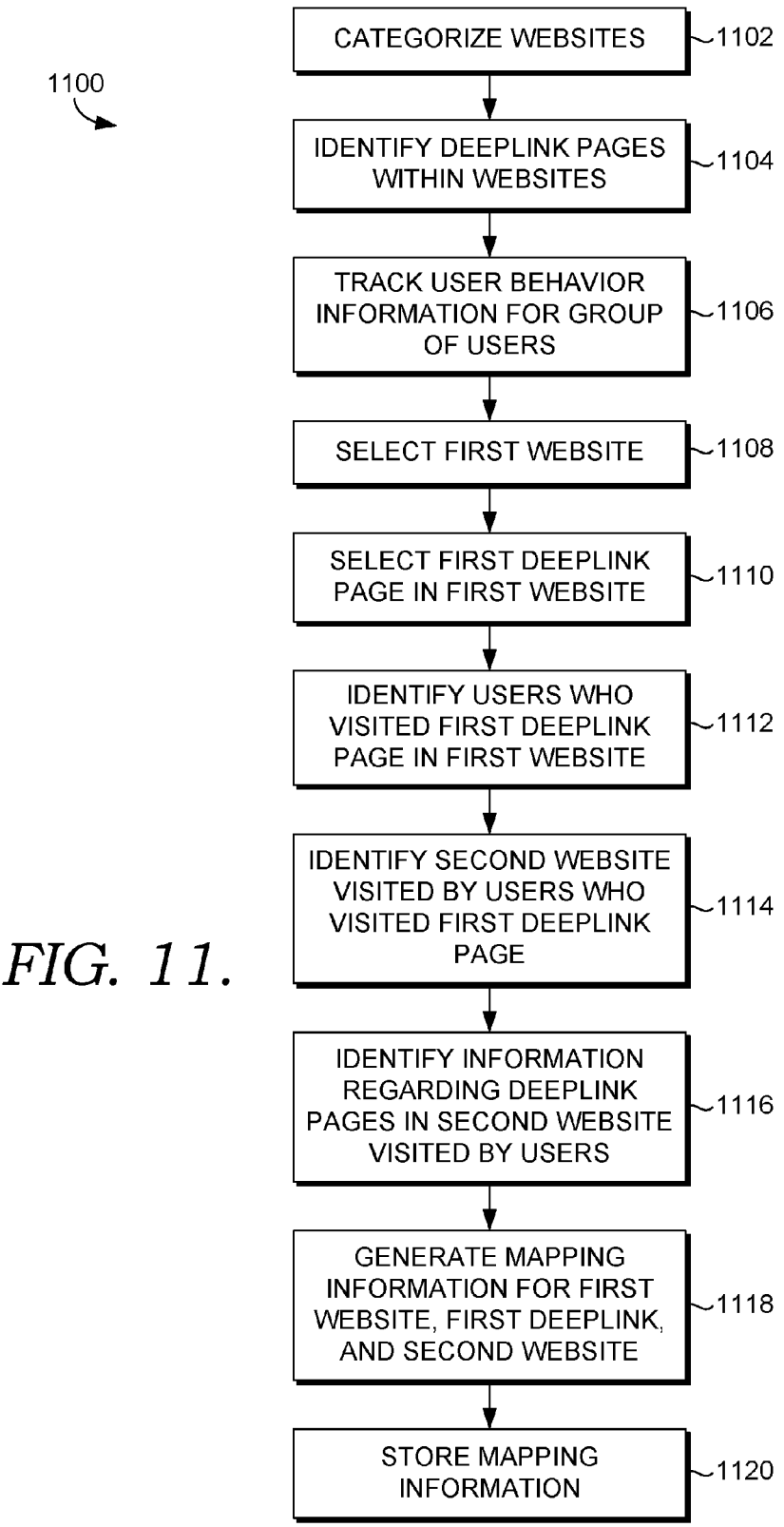
FIG. 11 is a flow diagram showing a method for gathering user behavior information for a group of end users for use in selecting deeplinks for search results in accordance with an embodiment of the present invention.

As discussed previously, some embodiments of the present invention gather user behavior information from a group of users and employ that information to improve the deeplinks provided with search results. Referring to FIG. 11, a flow diagram is provided that illustrates a method 1100 for gathering user behavior information for a group of end users for use in selecting deeplinks for search results. As shown at block 1102, websites may initially be categorized, and deeplink pages within websites may also be identified, as well as a deeplink page type for the deeplink pages, as shown at block 1104. These may be performed similar to blocks 902 and 904 discussed above with reference to FIG. 9.

As shown at block 1106, user behavior information is tracked for a group of end users. The user behavior information may be tracked for any group of end users. For instance, the information may be tracked for all end users. In other instances, the information may be tracked for end users belonging to a certain community, such as end users linked together in a social network.

The user behavior information may include any of a variety of different information. Additionally, the information may be gathered in view of the website categorizations and deeplink types identified at blocks 1102 and 1104. For instance, when end users browse to particular web pages or select particular deeplinks in search results to access corresponding web pages, the system may be able to recognize the web pages as deeplink pages of a particular type based on the analysis performed at blocks 1102 and 1104. Additionally, the system may recognize the website categories of the websites at which the visited web pages are located. In other instances, the user behavior information may simply include an indication of web pages visited and/or deeplinks selected from search results without additional identification based on the website categorizations and/or deeplink type information.

The user behavior information may be gathered from, among other things, end users' selections of deeplinks from search results and general web browsing information for the end users. By way of example only and not limitation, the information gathered may include: what deeplinks were selected from search results, the type of a selected deeplink, the category of website to which a selected deeplink belongs, how long end users dwelled at a deeplink page, how many times end users selected a particular deeplink, how many times end users selected deeplinks of a particular type, how recently end users selected a particular deeplink, what web pages the end users visited, the type of deeplink to which visited web pages correspond, the category of website to which a visited website belongs, how long the end users dwelled at a web page, how many times the end users visited a particular web page, how many times the end users visited web pages of a particular deeplink type, how recently the end users visited a particular web page.

A first website is selected at block 1108. Additionally, a first deeplink page at the first website is selected, as shown at block 1110. End users who visited the first deeplink page at the first website are identified from the user behavior information, as shown at block 1112.

A second website visited by the end users identified at block 1112 is determined from the user behavior information, as shown at block 1114. Additionally, information regarding deeplink pages at the second website visited by those end users is determined from the user behavior information, as shown at block 1116. The information may include, for instance, an indication of the deeplink pages visited, dwell time on the deeplink pages, the number of times the deeplink pages were visited, and how recent the deeplink pages were visited.

Mapping information is generated, as shown at block 1118. The mapping information may map the first deeplink at the first website to the second website and information regarding deeplink pages at the second website visited by the end users identified at block 1112. The information regarding the deeplink pages visited at the second website may include detailed information identified at block 1116 (e.g., an indication of the deeplink pages visited, dwell time on the deeplink pages, the number of times the deeplink pages were visited, and how recent the deeplink pages were visited). Alternatively, the information may be derived from that detailed information.

In some instances, the information may be processed to select one or more deeplink pages at the second website. For instance, an algorithm may be employed that weights various aspects of the different information to determine a likelihood that an end user that has previously visited the first deeplink at the first website would visit a particular deeplink at the second website. An indication of one or more deeplinks from the second website may be included in the mapping information based on those deeplinks have the highest likelihood.

For example, suppose that the first deeplink page is a "televisions" deeplink page at the website "www.sears.com," and the second website is "www.frys.com." The above process may identify end users who visited the "televisions" deeplink page at the website "www.sears.com" and determine which deeplink pages those end users visited at the website "www.frys.com." For instance, the information may indicate that 70% of those end users visited a "television" deeplink page at the website "www.frys.com," 25% of those end users visited a "camera" deeplink page at the website "www.frys.com," and 5% of those end users visited other miscellaneous deeplink pages at the website "www.frys.com." Based on this information, the mapping information may map the "televisions" deeplink page at the website "www.sears.com" to for "www.frys.com" and the associated information (i.e., 70% "televisions" deeplink, 25% "camera" deeplink, etc.).

The mapping information is stored, as shown at block 1120. Accordingly, the mapping information may be used to select deeplinks for search results, for instance, using the method 1200 discussed below with reference to FIG. 12.

The process of blocks 1114 through 1120 may be performed for any number of other websites visited by end users who visited the first deeplink in the first website. As such, a variety of mapping information may be generated for the first deeplink. The overall process may also be performed for other deeplinks in the first website, as well as other deeplinks in other websites. As such, mapping information may be generated for various deeplinks and websites to facilitate deeplink selections.

Figure 12:
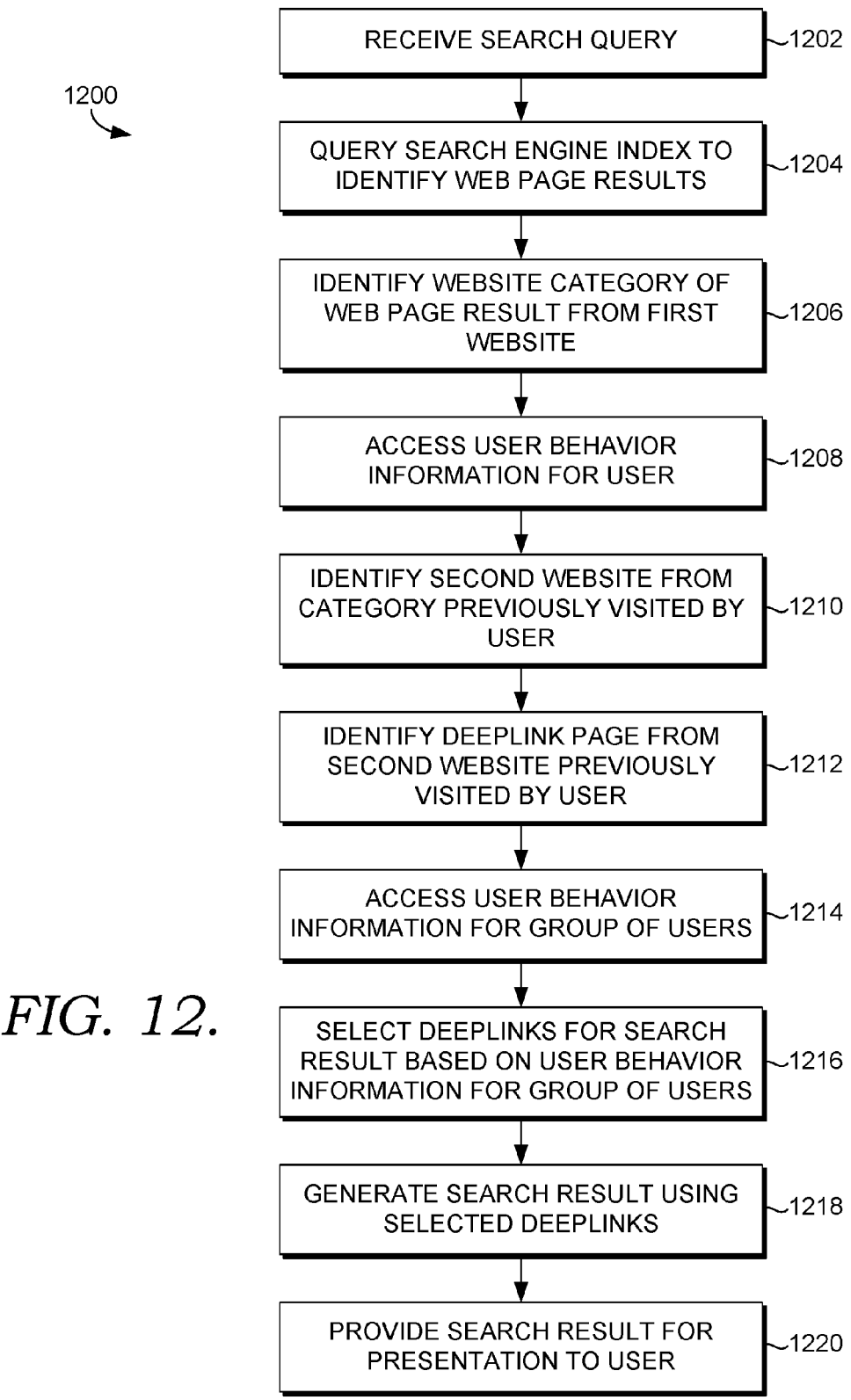
FIG. 12 is a flow diagram showing a method for using behavior information for a group of end users to select deeplinks for a search result in accordance with an embodiment of the present invention.

Turning to FIG. 12, a flow diagram is provided that illustrates a method 1200 for using behavior information for a group of users to select deeplinks for a search result. As shown at block 1202, a search query is received from an end user. In response to the search query, a search engine index is searched to identify relevant web pages, as shown at block 1204.

The website category of one of the web page results is identified, as shown at block 1206. For instance, metadata may be stored that identifies the website categories previously determined (e.g., at block 1102 of FIG. 11) to allow for the categories to be recognized at search time. The category information may be stored for a website such that when a web page from that website is identified as a result for a search, the category may be determined, for example, by identifying the website from the domain name in the URL of the web page result.

User behavior information for the end user for the identified category is accessed, as shown at block 1208. In particular, the user behavior information includes information regarding deeplink pages visited by the end user. For instance, the information may have been gathered using the method 900 discussed above with reference to FIG. 9.

A second website that was previously visited by the user and from the same website category as the first website is identified from the user's behavior information, as shown at block 1210. A deeplink page from the second website that was previously visited by the end user is also identified from the user's behavior information, as shown at block 1212.

User behavior information for a group of end users is accessed, as shown at block 1214. The user behavior information may include information regarding deeplink pages visited by the end users.

Deeplinks are selected for the search result based on the user behavior information for the group of end users, as shown at block 1216. Generally, information may be determined from the user behavior information for the group of end users regarding deeplink pages at the first website visited by end users who also visited the second deeplink page at the second website. The deeplinks are selected for the search result based on the information regarding those deeplink pages at the first website.

In some instances, the user behavior information for the group of end users accessed at block 1214 and used for deeplink selection at block 1216 may have been generated via some pre-processing. For instance, the user behavior information may comprise mapping information such as that generated by the method 1100 of FIG. 11. In such instances, appropriate mapping information may be accessed based on the first website, second website, and the deeplink page visited by the end user at the second website. In particular, the mapping information may be based on the deeplinks at the first website visited by end users who also visited the second deeplink at the second website. If such mapping information is available, information regarding deeplinks at the first website visited by end users who also visited the second deeplink at the second website may be simply retrieved from the mapping information.

In other instances, the user behavior information for the group of end users accessed at block 1214 and used for deeplink selection at block 1216 may not have been pre-processed or may have undergone less pre-processing. For instance, the user behavior information may simply identify deeplink pages visited at websites by the group of end users. In such instances, a process such as that of FIG. 11 may be performed at search time to identify information regarding deeplinks at the first website visited by end users who also visited the second deeplink at the second website.

A search result is generated for the web page, as shown at block 1218. The search result may include the deeplinks selected at block 1216. The search result is then provided to the end user device for presentation to the end user, as shown at block 1220. The deeplinks included with the search result may include both default deeplinks and deeplinks selected based on user behavior information. In some instances, the deeplinks selected based on user behavior information may be displayed differently than the other deeplinks (e.g., default deeplinks) and/or using some indication to identify these deeplinks as being based on user behavior information or otherwise personalized for the end user. For instance, the deeplinks selected based on user behavior information may be highlighted or displayed with other different text treatments (bolding, underlining, etc.). As another example, the deeplinks selected based on user behavior information may be provided in a different area of the search result separate from the other deeplinks.

A number of search results may be returned in response to search queries. In some instances, only the top search result may be processed to select deeplinks using embodiments of the present invention, such as the method 1200 of FIG. 12. In other instances, deeplinks may be selected using the method 1200 of FIG. 12 for any search result. Any and all combinations and variations thereof are contemplated to be within the scope of embodiments of the present invention.

Figure 13:
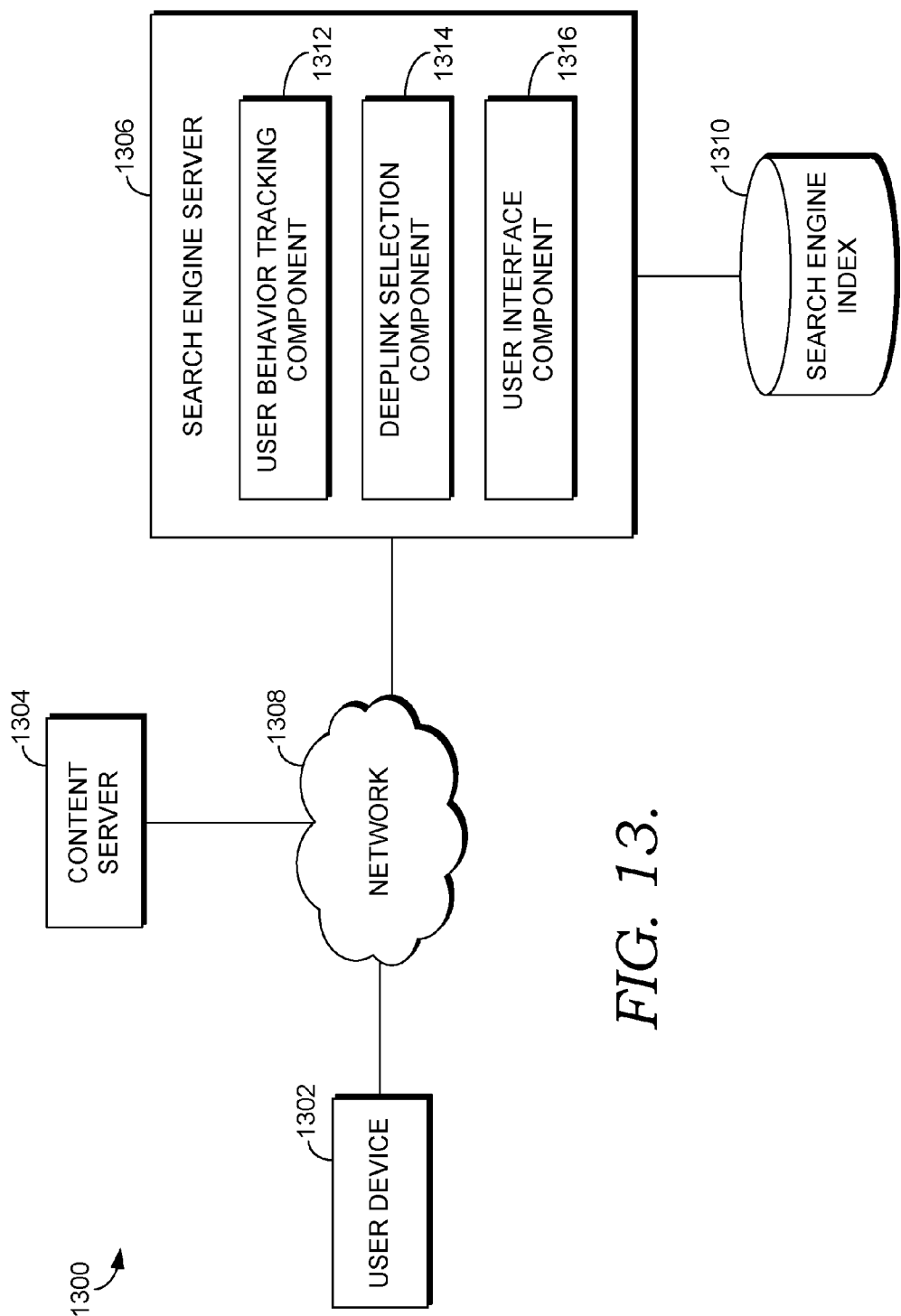
FIG. 13 is a block diagram of an exemplary system in which embodiments of the invention may be employed.

Referring next to FIG. 13, a block diagram is provided illustrating an exemplary system 1300 in which some embodiments of the present invention may be employed. It should be understood that this arrangement is set forth only as an example. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 1300 may include a user device 1302, content server 1304, and search engine server 1306. Each of the components shown in FIG. 13 may be any type of computing device, such as computing device 100 described with reference to FIG. 1, for example. The components may communicate with each other via a network 1308, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 1300 within the scope of the present invention. Each may comprise a single device or multiple devices cooperating in a distributed environment. For instance, the search engine server 1306 may comprise multiple devices arranged in a distributed environment that collectively provide the functionality of the search engine server 1306 described herein. Additionally, other components not shown may also be included within the system 1300.

The search engine server 1306 generally operates to index information regarding web pages served by content servers, such as the content server 1304, in a search engine index 1310. When the search engine server 1306 receives search queries from user devices, such as the user device 1302, the search engine queries the search engine index 1310 to identify search results based on the users' search queries and returns those search results to the user devices. In accordance with some embodiments of the present invention, the search engine server 1306 is also configured to track user behavior information and use that information to select deeplinks for search results that are more personalized for end users.

In the embodiment shown in FIG. 13, the search engine server 1306 includes, among other things, a user behavior tracking component 1312, a deeplink selection component 1314, and a user interface component 1316. Although not shown in FIG. 13, the search engine server 1306 may include components from the search engine server 206 described above with reference to FIG. 2, for instance, to categorize websites and identify deeplink pages and deeplink page types common to websites within given categories.

The user behavior tracking component 1312 operates to gather user behavior information. The user behavior information may be tracked on an individual basis and may also be tracked on a group basis. In some instances, the user behavior tracking component 1312 may gather user behavior information using approaches such as those described above with reference to FIGS. 9 and 11. The user behavior information may be stored in an associated data store (not shown).

The deeplink selection component 1314 operates to select deeplinks for search results in response to search queries from user devices, such as the user device 1302. In some instances, the deeplink selection component 1314 may provide personalized deeplinks for an end user based on the end user's personal behavior information tracked by the user behavior tracking component 1312. For instance, the deeplink selection component 1314 may provide personalized deeplinks using an approach such as that described above with reference to FIG. 10. The deeplink selection component 1314 may also provide deeplinks based on both an end user's personal behavior information and user behavior information for a group of users. For instance, the deeplink selection component 1314 may provide deeplinks using an approach such as that described above with reference to FIG. 12.

The user interface component 1318 provides an interface to user devices, such as the user device 1302, that may allow users to submit search queries to the search engine server 1306 and to receive search results from the search engine server 1306. It should be understood that the user device 1302 may be any type of computing device employed by a user to submit search queries and receive search results. By way of example only and not limitation, the user device 1302 may be a desktop computer, a laptop computer, a tablet computer, a mobile device, or other type of computing device. The user device 1302 may include an application that allows a user to enter a search query and submit the search query to the search engine server 1306 to retrieve search results. For instance, the user device 1302 may include a web browser that includes a search input box or allows a user to access a search page to submit a search query. Other mechanisms for submitting search queries to search engines are contemplated to be within the scope of embodiments of the present invention.

When the search engine server 1306 receives a search query from the user device 1302, the search engine index 1310 is queried to identify search results. Additionally, the deeplink selection component 1314 operates to select deeplinks for at least one of the search results. The search results are returned to the user device 1302 for presentation to the end user. Accordingly, the search results include at least one search result with deeplinks that have been selected for the particular end user who submitted the search query.

As can be understood, embodiments of the present invention include selecting personalized search results for an end user based on the end user's personal behavior information and/or user behavior information of other users. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method performed by a server device, the method comprising:
    receiving a search query from an end user;
    identifying a web page in response to the search query by querying a search engine index based on the search query;
    identifying a website category of a website at which the web page is located;
    accessing user behavior information for the end user;
    identifying, from the user behavior information for the end user, a second deeplink page visited by the end user at a second website within the website category to which the web page corresponds;
    accessing user behavior information for a group of end users;
    selecting, using the user behavior information for the group of users, a deeplink for a search result for the web page based at least in part on deeplink pages visited at the website by a subset of users from the group of end users who also visited the second deeplink page at the second website;
    generating the search result for the web page to include the deeplink; and
    providing the search result for presentation to the end user.

2. The method of claim 1, wherein the group of end users comprises end users who are associated with the end user in a social network.

3. The method of claim 1, wherein the user behavior information for the group of end users comprises information regarding deeplink pages visited by the group of end users, and wherein selecting the deeplink for the search result comprises:
    identifying, from the user behavior information for the group of end users, the subset of end users who visited the second deeplink page at the second website; and
    identifying, from the user behavior information for the group of end users, deeplink pages at the first website visited by the subset of end users who visited the second deeplink page at the second website.

4. The method of claim 1, wherein the user behavior information for the group of end users comprises mapping information, and wherein selecting the deeplink for the search result comprises:
    identifying a set of mapping information that maps the second deeplink page at the second website to information regarding deeplink pages visited at the first website; and
    employing the information regarding the deeplink pages visited at the first website to select the deeplink for the search result.

5. The method of claim 4, wherein the method further comprises generating the set of mapping information by:

selecting the second website;
selecting the second deeplink at the second website;
identifying, from tracked behavior information for the group of end users, the subset of end users that visited the second deeplink page at the second website;
selecting the first website;
identifying, from the tracked behavior information for the group of users, deeplink pages at the first website visited by the subset of end users who visited the second deeplink at the second website; and
generating the set of mapping information to map the second deeplink page at the second website to information regarding deeplink pages at the first website visited by the subset of end users who visited the second deeplink at the second website.

6. The method of claim 1, wherein the user behavior information comprises information regarding the end user's selections of deeplinks from search results.

7. The method of claim 1, wherein the user behavior information comprises information regarding web pages visited by the end user during general web browsing.

8. The method of claim 1, wherein the user behavior information is from a current browsing or search session.

9. One or more computer storage media storing computer-useable instructions that, when used by one or more computing devices, cause the one or more computing devices to perform operations, the operations comprising:
receiving a search query from an end user;
identifying a web page in response to the search query by querying a search engine index based on the search query;
identifying a website category of a website at which the web page is located;
accessing user behavior information for the end user;
identifying, from the user behavior information for the end user, a second deeplink page visited by the end user at a second website within the website category to which the web page corresponds;
accessing user behavior information for a group of end users;
selecting, using the user behavior information for the group of users, a deeplink for a search result for the web page based at least in part on deeplink pages visited at the website by a subset of users from the group of end users who also visited the second deeplink page at the second website;
generating the search result for the web page to include the deeplink; and
providing the search result for presentation to the end user.

10. The one or more computer storage media of claim 9, wherein the group of end users comprises end users who are associated with the end user in a social network.

11. The one or more computer storage media of claim 9, wherein the user behavior information for the group of end users comprises information regarding deeplink pages visited by the group of end users, and wherein selecting the deeplink for the search result comprises:
identifying, from the user behavior information for the group of end users, the subset of end users who visited the second deeplink page at the second website; and
identifying, from the user behavior information for the group of end users, deeplink pages at the first website visited by the subset of end users who visited the second deeplink page at the second website.

12. The one or more computer storage media of claim 9, wherein the user behavior information for the group of end users comprises mapping information, and wherein selecting the deeplink for the search result comprises:
identifying a set of mapping information that maps the second deeplink page at the second website to information regarding deeplink pages visited at the first website; and
employing the information regarding the deeplink pages visited at the first website to select the deeplink for the search result.

13. The one or more computer storage media of claim 12, wherein the operations further comprise generating the set of mapping information by:
selecting the second website;
selecting the second deeplink at the second website;
identifying, from tracked behavior information for the group of end users, the subset of end users that visited the second deeplink page at the second website;
selecting the first website;
identifying, from the tracked behavior information for the group of users, deeplink pages at the first website visited by the subset of end users who visited the second deeplink at the second website; and
generating the set of mapping information to map the second deeplink page at the second website to information regarding deeplink pages at the first website visited by the subset of end users who visited the second deeplink at the second website.

14. The one or more computer storage media of claim 9, wherein the user behavior information is from a current browsing or search session.

15. A computing device comprising:
one or more processors; and
one or more computer storage media storing computer-useable instructions that, when used by the one or more processors, cause the one or more processors to:
receive a search query from an end user;
identify a web page in response to the search query by querying a search engine index based on the search query;
identify a website category of a website at which the web page is located;
access user behavior information for the end user;
identify, from the user behavior information for the end user, a second deeplink page visited by the end user at a second website within the website category to which the web page corresponds;
access user behavior information for a group of end users;
select, using the user behavior information for the group of users, a deeplink for a search result for the web page based at least in part on deeplink pages visited at the website by a subset of users from the group of end users who also visited the second deeplink page at the second website;
generate the search result for the web page to include the deeplink; and
provide the search result for presentation to the end user.

16. The computing device of claim 15, wherein the group of end users comprises end users who are associated with the end user in a social network.

17. The computing device of claim 15, wherein the user behavior information for the group of end users comprises information regarding deeplink pages visited by the group of end users, and wherein the deeplink for the search result is selected by:

identifying, from the user behavior information for the group of end users, the subset of end users who visited the second deeplink page at the second website; and identifying, from the user behavior information for the group of end users, deeplink pages at the first website visited by the subset of end users who visited the second deeplink page at the second website.

18. The computing device of claim 15, wherein the user behavior information for the group of end users comprises mapping information, and wherein the deeplink for the search result is selected by:

identifying a set of mapping information that maps the second deeplink page at the second website to information regarding deeplink pages visited at the first website; and employing the information regarding the deeplink pages visited at the first website to select the deeplink for the search result.

19. The computing device of claim 18, wherein the set of mapping information is generated by:

selecting the second website;

selecting the second deeplink at the second website;

identifying, from tracked behavior information for the group of end users, the subset of end users that visited the second deeplink page at the second website;

selecting the first website;

identifying, from the tracked behavior information for the group of users, deeplink pages at the first website visited by the subset of end users who visited the second deeplink at the second website; and generating the set of mapping information to map the second deeplink page at the second website to information regarding deeplink pages at the first website visited by the subset of end users who visited the second deeplink at the second website.

20. The computing device of claim 15, wherein the user behavior information is from a current browsing or search session.

* * * * *